United States Patent Office 3,078,271
Patented Feb. 19, 1963

3,078,271
CERTAIN OXYALKYLATION PRODUCTS DERIVED IN TURN FROM REACTIVE NITROGEN-CONTAINING COMPOUNDS AND POLYEPOXIDES, AND PROCESS FOR MAKING SAME
Melvin De Groote, St. Louis, and Kwan-Ting Shen, Brentwood, Mo., assignors to Petrolite Corporation, Wilmington, Del., a corporation of Delaware
No Drawing. Original application Aug. 26, 1953, Ser. No. 376,763, now Patent No. 2,819,222, dated Jan. 7, 1958. Divided and this application Dec. 6, 1956, Ser. No. 626,611
1 Claim. (Cl. 260—247.5)

The present invention is a continuation of our co-pending applications, Serial Nos. 305,079, now abandoned and 305,080, now Patent No. 2,723,241, both filed August 18, 1952 and a division of our copending application Serial No. 376,763, filed August 26, 1953 and now Patent No. 2,819,222.

Our invention is concerned with new chemical products

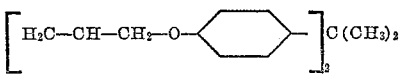

or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

The present invention may be characterized in one aspect in that it is concerened with a process of oxyalkylating by means of monoepoxides, the reaction product obtained in turn by reacting certain monomeric non-resinous nitrogen-containing compounds, hereinafter described in detail, with certain phenolic polyepoxides, particularly diepoxides, also hereinafter described in detail, and cogenerically associated compounds formed in their preparation.

In preparing diepoxides or the low molal polymers one does usually obtain cogeneric materials which may include monoepoxides. However, the cogeneric mixture is invariably characterized by the fact that there is on the average, based on the molecular weight, of course, more than one epoxide group per molecule.

A more limited aspect of the present invention is represented by the oxyalkylation products wherein the polyepoxide is represented by (1) Compounds of the following formula:

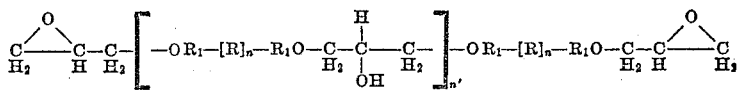

(2) Cogenerically associated compounds formed in the preparation of (1) preceding,
with the proviso that it consists principally of the monomer as distinguished from other cogeners.

Not withstanding the fact that subsequent data will be presented in considerable detail, yet the description becomes somewhat involved and certain facts should be kept in mind. The epoxides, and particularly the diepoxides, may have no connecting bridge between the phenolic nuclei as in the case of a diphenyl derivative or may have a variety of connecting bridges, i.e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i.e., in preference to the polymer or mixture of polymer and monomer.

Stated another way, we would prefer to use materials of the kind described, for example, U.S. Patent 2,530,353, dated November 14, 1950. Said patent described compounds having the general formula

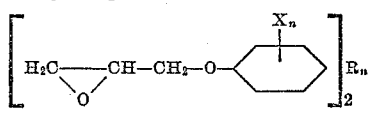

wherein R is an aliphatic hydrocarbon bridge, each $n$ independently has one of the values 0 and 1, and X is an alkyl radical containing from 1 to 4 carbon atoms.

The compounds having two oxirane rings and employed for combination with the reactive amine, such as triethanolamine, are characterized by the following formula and cogenerically associated compounds formed in their preparation:

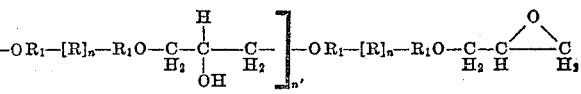

in which R represents a divalent radical selected from the class of ketone residues formed by the elimination of the ketonic oxygen atom and aldehyde residues obtained by the elimination of the aldehydic-oxygen atom, the divalent radical

the divalent

radical, the divalent sulfone radical, and the divalent monosulfide radical —S—, the divalent radical

and the divalent disulfide radical —S—S—; and $R_1O$ is the divalent radical obtained by the elimination of a hydroxyl hydrogen atom and a nuclear hydrogen atom from the phenol

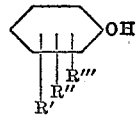

in which R', R'', and R''' represent hydrogen and hydrocarbon substituents of the aromatic nucleus, said substituent member having not over 16 carbon atoms; $n$ represents an integer including zero and 1, and $n'$ represents a whole number not greater than 3. The above-mentioned compounds and those cogenerically associated compounds formed in their preparation are thermoplastic and organic solvent-soluble. Reference to being thermoplastic characterizes products as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with amine. In such instances, of course, the solvent selected would have to be one which is not susceptible to oxyalkylation, as for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i.e., the 1,2-epoxy ring. Furthermore, where a compound has two or more oxirane rings will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4-carbon atoms and is formally described as 1,2-epoxy-3,4-epoxybutane (1,2,3,4 diepoxybutane).

It well may be that even though the previously suggested formula represents the principal component, or compounds, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U.S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not resins and have certain solubility characteristics not inherent in resins.

Having obtained a reactant having generally 2 epoxy rings as depicted in the last formula preceding, or low molal polymers thereof, it becomes obvious the reaction can take place with any one of a number of mono-amines or poly-amines which are oxyalkylation-susceptible. There is available considerable literature, particularly patent literature, dealing with oxyalkylation-susceptible amines or simple derivatives thereof, such as the esters of hydroxylated amines, for instance, higher fatty acid esters of triethanolamine and the like. Reference is made to such literature for a list of a large number of suitable reactants which do not require detailed description, although a rather comprehensive number of examples appear subsequently.

To illustrate the products which represent the subject matter of the present invention reference will be made to a reaction involving a mole of the oxylkylating agent, i.e., the compound having two oxirane rings and triethanolamine. Proceeding with the example previously described it is obvious the reaction ratio of two moles of the amine to one mole of the oxyalkylating agent gives a product which may be indicated as follows:

groups present, whether one or more, may or may not be significantly basic and it is immaterial whether aqueous solubility represents the anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly soluble in 5% acetic acid. For instance, the products freed from any solvent can be shaken with five to twenty times their weight of distilled water at ordinary temperature and are at least self-dispersing, and in many instances water-soluble, in fact, colloidally soluble. This is particularly true when there happens to be one or more nitrogen atoms present or a repetitious ether likage as in the case of oxyethylated or oxypropylated monoamines or polyamines.

For reasons which are obvious, the intermediate product is oxyalkylation-susceptible. It goes without saying that the final step in the process of manufacture is nothing more nor less than reacting any of the products obtained from the nitrogen-containing reactants, with ethylene oxide, propylene oxide, butylene oxide, or the like.

Similarily, the products derived by oxyalkylation with a monoepoxide can be subjected to further reaction with a product having both a nitrogen group and a 1,2-epoxy group such as 3-dialkylaminoepoxypropane. See U.S. Patent No. 2,520,093, dated August 22, 1950, to Gross.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics spray oils, water-repellent textile finishes; as lubricants, etc.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorour shaking and surface activity makes its presence manifest. It is understood the reference in

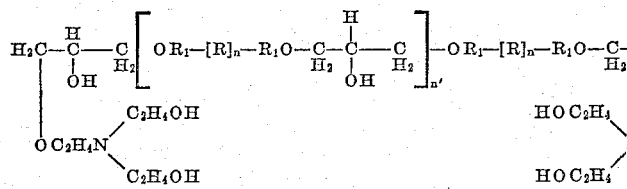 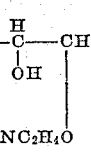

in which the various characteristics have their prior significance. However, molal ratios may be varied as noted subsequently. The product thus obtained was reacted further with monoepoxide as described elsewhere.

Such intermediate product as above noted (prior to oxyalkylation with a monoepoxide) must, in turn also be soluble but solubility is not limited to an organic solvent but may include water or, for that matter, a solution of water containing an acid such as hydrochloric acid, acetic acid, hydroxyacetic acid, etc. In other words, the nitrogen the hereto appended claims as to the use of xylene in the emulsification test includes such obvious variant.

For purpose of convenience what is said hereinafter will be divided into eight parts with Part 3, in turn, being divided into three subdivisions:

Part 1 is concerned with our preference in regard to the polyepoxide and particularly the diexpoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II;

Part 3, Subdivision C, is concerned with miscellaneous phenolic reactants suitable for diepoxide preparation;

Part 4 is concerned with suitable nitrogen-containing compounds to be employed for reaction with the polyepoxides;

Part 5 is concerned with the reactions involving the two preceding types of materials and examples obtained by such reactions;

Part 6 is concerned with reactions involving the intermediates obtained in the manner described in Part 5, preceding, and certain alpha-beta monoepoxides having not over 4 carbon atoms;

Part 7 is concerned with the resolution of petroleum emulsions of the water-in-oil type by means of the previous described chemical compounds or reaction products; and Part 8 is concerned with uses for the products herein described, either as such or after modification, including any applications other than those involving resolution or petroleum emulsions of the water-in-oil type.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

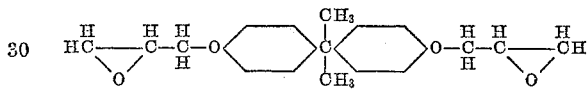

Reference has just been made to bis-phenol A and a suitable epoxide derived therefrom. Bis-phenol A is dihydroxy-diphenyldimethyl methane, with the 4,4-isomers predominating and with lesser quantities of the 2,2' and 4,2' isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. If a product such as bis-phenol A is employed the ultimate compound in monomeric form employed as a reactant in the present invention has the following structure:

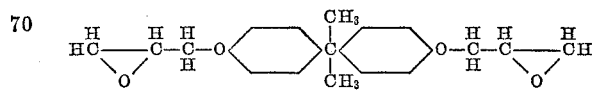

Treatment with epichlorohydrin, for example, does not yield this product initially but there is an intermediate produced which can be indicated by the following structure:

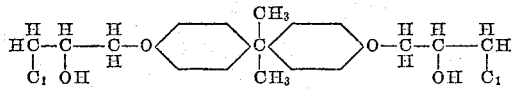

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

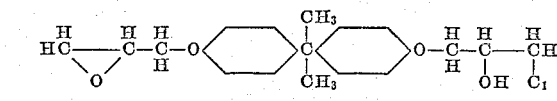

or

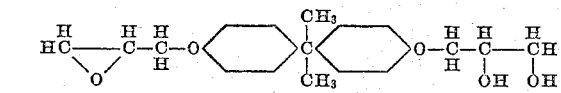

(2) Even if one's starts with the reactants in the preferred ratio, to wit, two parts of epichlorohydrin to one part of bis-phenol A, they do not necessarily so react and as a result one may obtain products in which more than two epichlorohydrin residues become attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i.e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a diepoxide, such as

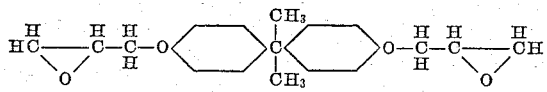

may react with a mole of bis-phenol A to give a monoepoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chlorine atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there is both an epoxide group and a chlorine atom present. See U.S. Patent No. 2,581,464, dated January 8, 1952, to Zech.

What has been said in regard to the theoretical aspect is, of course, closely related to the actual method of preparation which is discussed in greater detail in Part 3, particularly sub-divisions A and B. There can be no clear line between the theoretical aspect and actual preparative steps. However, in order to summarize or illustrate what has been said in Part 1, immediately preceding reference will be made to a typical example which already has been employed for purpose of illustration. The particular example is

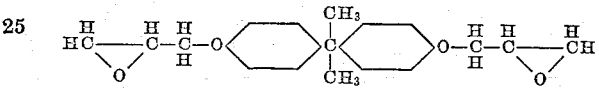

It is obvious that two moles of such material combine readily with one mole of bis-phenol A,

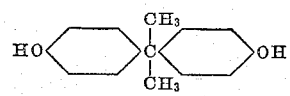

to produce the product which is one step further along, at least, towards polymerization. In other words, one prior example shows the reaction product obtained from one mole of the bisphenol A and two moles of epichlorohydrin. This product in turn would represent three moles of bisphenol A and four moles of epichlorohydrin.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York City. The word "Epon" is a registered trademark of the Shell Chemical Corporation.

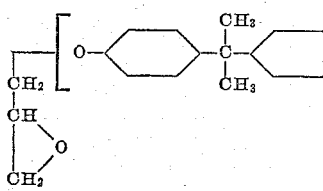 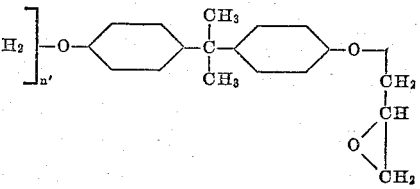

For the purpose of the instant invention, $n'$ may represent a number including zero, and at the most a low number such as 1, 2 or 3. This limitation does not exist in actual efforts to obtain resins as differentiated from the herein described soluble materials. It is quite probable that in the resinous products as marketed for coating use the value of $n'$ is usually substantially higher. Note again what has been said previously that any formula is, at best, an over-simplification, or at the most represents perhaps only the more important or principal constituent or constituents. These materials may vary from simple non-resinous to complex resinous epoxides which are polyether derivatives of polyhydric phenols containing an average of more than one epoxide group per molecule and free from functional groups other than epoxide and hydroxyl groups.

Referring now to what has been said previously, to wit, compounds having both an epoxy ring or the equivalent and also a hydroxyl group, one need go no further than to consider the reaction product of

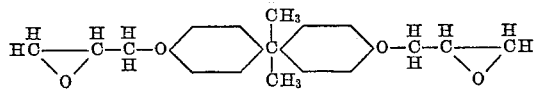

and bisphenol A in a mole-for-mole ratio, since the initial reactant would yield a product having an unreacted epoxy ring and two reactive hydroxyl radicals. Referring again to a previous formula, consider an example where two moles of bisphenol A have been reacted with 3 moles of epichlorohydrin. The simplest compound formed would be thus:

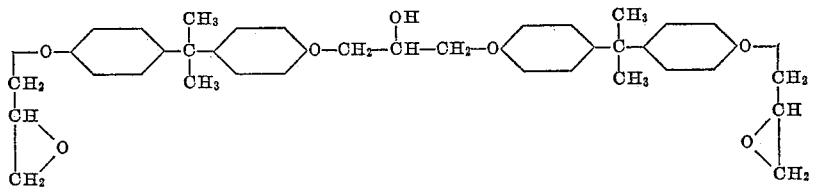

Such a compound is comparable to other compounds having both the hydroxyl and epoxy ring such as 9,10-epoxy octadecanol. The ease with which this type of compound polymerizes is pointed out by U.S. Patent No. 2,457,329, dated December 28, 1948, to Swern et al.

The same difficulty which involves the tendency to polymerize on the part of compounds having a reactive ring and a hydroxyl radical may be illustrated by compounds where, instead of the oxirane ring (1,2-epoxy ring) there is present a 1,3-epoxy ring. Such compounds are derivatives of trimethylene oxide rather than ethylene oxide. See U.S. Patents Nos. 2,462,047 and 2,462,048, both dated February 15, 1949, to Wyler.

At the expense of repetition of what appeared previously, it may be well to recall that these materials may vary from simple soluble non-resinous to complex nonin which the various characters have their prior significance and in which $R_1O$ is the divalent radical obtained by the elimination of a hydroxyl hydrogen atom and a nuclear hydrogen atom from the phenol

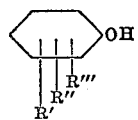

in which $R'$, $R''$, $R'''$ represent a member of the class consisting of hydrogen and hydrocarbon substituents of the aromatic nucleus, said substituent member having not over 18 carbon atoms; $n$ represents an integer selected from the class of zero and 1, and $n'$ represents a whole number not greater than 3.

PART 3

*Subdivision A*

The preparations of the diepoxy derivatives of the diphenols, which are sometimes referred to as diglycidyl ethers, have been described in a number of patents. For convenience, reference will be made to two only, to wit, U.S. Patent 2,506,486, and U.S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(epoxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_4OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_5.C_6H_3OH)_2$ | 2,2-bis(4-(2,3-epoxypropoxy)2-tertiarybutyl phenyl)propane | 2,530,353 | soluble resinous epoxies which are polyether derivatives of polyhydric phenols containing an average of more than one epoxide group per molecule and free from functional groups other than epoxide and hydroxyl groups. The former are here included, but the latter, i.e., highly resinous or insoluble types, are not.

In summary then in light of what has been said, compounds suitable for reaction with amines may be summarized by the following formula:

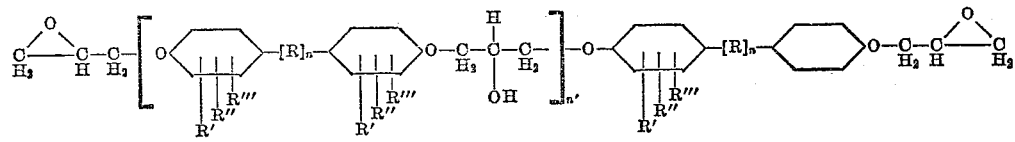

or for greater simplicity the formula could be restated thus:

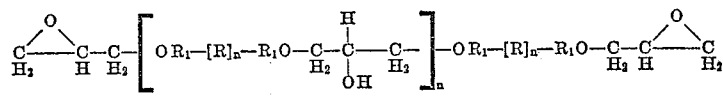

*Subdivision B*

As to the preparation of low-molal polymeric epoxides or mixtures reference is made to numerous patents and particularly U.S. Patents Nos. 2,575,558 and 2,582,985.

To the extent that one can propose a formula, even though it is an over-simplified idealization, it appears extremely desirable to include specific reference to aforementioned U.S. Patent No. 2,575,558. The reason is that this patent includes the same formula which has been referred to previously in Part 2, which is concerned with the theoretical aspects of diepoxide preparation. Furthermore, this formula, or its counterpart, appears in the hereto appended claims.

In light of aforementioned U.S. Patent No. 2,575,558, the following examples can be specified by reference to the formula therein provided one still bears in mind it is in essence an over-simplification.

TABLE II

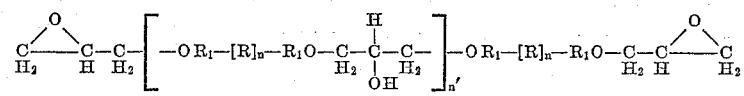

(in which the characters have their previous significance)

| Example number | —R₁O— from H R₁OH | —R— | $n$ | $n'$ | Remarks |
|---|---|---|---|---|---|
| B1 | Hydroxy benzene | CH₃ / —C— / CH₃ | 1 | 0, 1, 2 | Phenol known as bis-phenol A. Low polymeric mixture about ⅔ or more where $n'=0$, remainder largely where $n'=1$, some where $n'=2$. |
| B2 | ......do...... | CH₃ / —C— / CH₂ / CH₃ | 1 | 0, 1, 2 | Phenol known as bis-phenol B. See note regarding B1 above. |
| B3 | Orthobutylphenol | CH₃ / —C— / CH₃ | 1 | 0, 1, 2 | Even though $n'$ is preferably 0, yet the usual reaction product might well contain materials where $n'$ is 1, or to a lesser degree 2. |
| B4 | Orthoamylphenol | CH₃ / —C— / CH₃ | 1 | 0, 1, 2 | Do. |
| B5 | Orthooctylphenol | CH₃ / —C— / CH₃ | 1 | 0, 1, 2 | Do. |
| B6 | Orthononylphenol | CH₃ / —C— / CH₃ | 1 | 0, 1, 2 | Do. |
| B7 | Orthododecylphenol | CH₃ / —C— / CH₃ | 1 | 0, 1, 2 | Do. |
| B8 | Metacresol | CH₃ / —C— / CH₃ | 1 | 0, 1, 2 | See prior note. This phenol used as initial material is known as bis-phenol C. For other suitable bis-phenols see U. S. Patent 2,564,191. |
| B9 | ......do...... | CH₃ / —C— / CH₃ / CH₃ | 1 | 0, 1, 2 | See prior note. |
| B10 | Dibutyl (ortho-para) phenol | H / —C— / H | 1 | 0, 1, 2 | Do. |
| B11 | Diamyl (ortho-para) phenol | H / —C— / H | 1 | 0, 1, 2 | Do. |
| B12 | Dioctyl (ortho-para) phenol | H / —C— / H | 1 | 0, 1, 2 | Do. |
| B13 | Dinonyl (ortho-para) phenol | H / —C— / H | 1 | 0, 1, 2 | Do. |
| B14 | Diamyl (ortho-para) phenol | H / —C— / CH₃ | 1 | 0, 1, 2 | Do. |
| B15 | ......do...... | H / —C— / C₂H₅ | 1 | 0, 1, 2 | Do. |
| B16 | Hydroxy benzene | O / —S— / O | 1 | 0, 1, 2 | Do. |
| B17 | Diamyl phenol (ortho-para) | —S—S— | 1 | 0, 1, 2 | Do. |
| B18 | ......do...... | —S— | 1 | 0, 1, 2 | Do. |

TABLE II—Continued

| Example number | —R₁O— from HR₁OH | —R— | n | n' | Remarks |
|---|---|---|---|---|---|
| B19 | Dibutyl phenol (ortho-para) | $-\underset{H}{\overset{H}{C}}-\underset{H}{\overset{H}{C}}-$ | 1 | 0, 1, 2 | Do. |
| B20 | ____do____ | $-\underset{H}{\overset{H}{C}}-\underset{H}{\overset{H}{C}}-$ | 1 | 0, 1, 2 | Do. |
| B21 | Dinonyl phenol (ortho-para) | $-\underset{H}{\overset{H}{C}}-\underset{H}{\overset{H}{C}}-$ | 1 | 0, 1, 2 | Do. |
| B22 | Hydroxy benzene | $-\overset{O}{\underset{\parallel}{C}}-$ | 1 | 0, 1, 2 | Do. |
| B23 | ____do____ | None | 0 | 0, 1, 2 | Do. |
| B24 | Ortho-isopropyl phenol | $-\underset{CH_3}{\overset{CH_3}{C}}-$ | 1 | 0, 1, 2 | See prior note. (As to preparation of 4,4′-isopropylidene bis-(2-isopropylphenol) see U. S. Patent No. 2,482,748, dated Sept. 27, 1949, to Dietzler.) |
| B25 | Para-octyl phenol | —CH₂—S—CH₂ | 1 | 0, 1, 2 | See prior note. (As to preparation of the phenol sulfide see U. S. Patent No. 2,488,134, dated Nov. 15, 1949, to Mikeska et al.) |
| B26 | Hydroxy benzene | $-\underset{\underset{\underset{C_2H_5}{\mid}}{\underset{O}{\mid}}}{\underset{CH_2}{\mid}}\overset{CH_3}{\underset{\mid}{C}}-$ | 1 | 0, 1, 2 | See prior note. (As to preparation of the phenol sulfide see U. S. Patent No. 2,526,545.) |

*Subdivision C*

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substitutents are usually in the ortho position and may be illustrated by a phenol of the following composition:

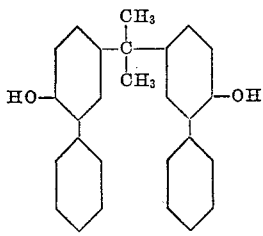

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

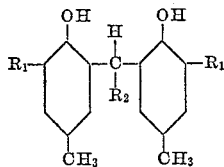

wherein R₁ is a substituent selected from the class consisting of secondary butyl and tertiary butyl groups and R₂ is a substituent selected from the class consisting of alkyl, cycloalkyl, aryl, aralkyl, and alkaryl groups, and wherein said alkyl group contains at least 3 carbon atoms. See U.S. Patent No. 2,515,907.

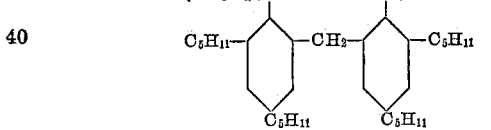

in which the —C₅H₁₁ groups are secondary amyl groups. See U.S. Patent No. 2,504,064.

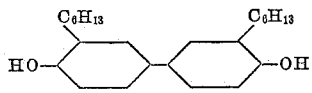

See U.S. Patent No. 2,285,563.

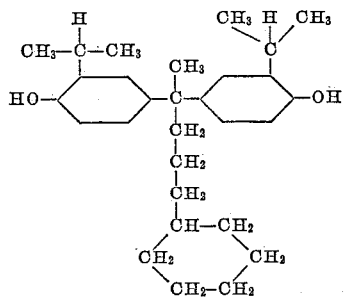

See U.S. Patent No. 2,503,196.

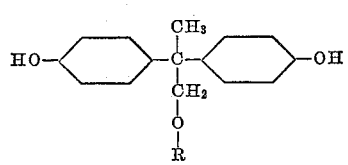

wherein R is a member of the group consisting of alkyl, and alkoxyalkyl radicals containing from 1 to 5 carbon atoms, inclusive, and aryl and chloraryl radicals of the benzene series. See U.S. Patent No. 2,526,545.

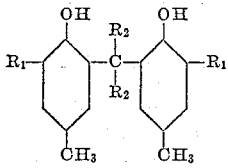

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U.S. Patent No. 2,515,906.

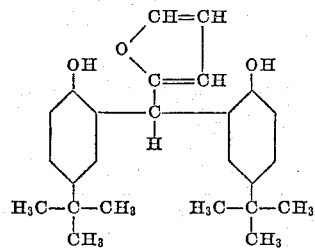

See U.S. Patent No. 2,515,908.

As to sulfides, the following compound is of interest:

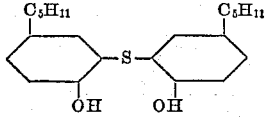

See U.S. Patent No. 2,331,448.

As to descriptions of various suitable phenol sulfides, reference is made to the following patents: U.S. Patents Nos. 2,246,321, 2,207,719, 2,174,248, 2,139,766, 2,244,021, and 2,195,539.

As to sulfones, see U.S. Patent No. 2,122,958.

As to suitable compounds obtained by the use of formaldehyde or some other aldehyde, particularly compounds such as

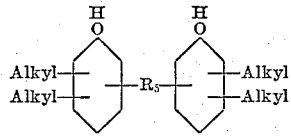

in which $R_5$ is a methylene radical, or a substituted methylene radical which represents the residue of an aldehyde and is preferably the unsubstituted methylene radical derived from formaldehyde. See U.S. Patent No. 2,430,002.

See also U.S. Patent No. 2,581,919 which describes di(dialkyl cresol) sulfides which include the monosulfides, the disulfides, and the polysulfides. The following formula represents the various dicresol sulfides of this invention:

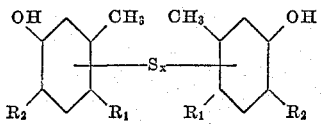

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

As previously noted, Part 4 is concerned with the amino reactants employed in conjunction with the polyepoxide reactant usually containing two oxirane rings. Since the reactant described in detail in Part 3, preceding, is essentially an oxyalkylating agent it is obvious that any amino compound, and more broadly any nitrogen-containing compound such as an amide, which is oxyalkylation susceptible is suitable for the present purpose. In essence, this means that the product must have a labile hydrogen attached to either oxygen or nitrogen. Such hydrogen atom may be attached directly to a nitrogen atom as in the case of an amide, an amine, or the like. However, it may be attached directly to oxygen as in the case of triethanolamine; or a labile hydrogen atom in the form of a hydroxyl group may appear in the acyl radical of an amide or the ester of an amine, such as an ester of ethanoldiethyl amine; although ricinoleic acid exemplifies an acyl radical with a hydroxyl group which is somewhat reactive, yet more satisfactory, is a hydroxy carboxylic acid such as

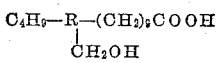

wherein R is a six-sided carbocycle of the formula $C_6H_9$, as described in U.S. Patent No. 2,457,640, dated December 28, 1948, to Bruson et al.

One need not necessarily use monoamino compounds or compounds containing a single nitrogen atom but may use polyamino compounds including, of course, compounds where there is more than one amide group. There is no limitation as to the group which is attached to the nitrogen atom insofar that it may be alkyl, aryl, alicyclic, and alkylaryl, arylalkyl, etc. Heterocyclic compounds such as morpholine may be employed. The amino compound or amido compound may be water-soluble or water-insoluble. The amine may contain a phenolic hydroxyl as, for example,

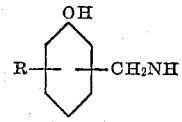

where R is an alkyl group generally having five carbon atoms or more. See U.S. Patent No. 2,410,911, dated November 12, 1946, to Wasson et al. Further examples appear in the subsequent text.

Needless to say, since it is specified that the amino compound or amido compound be oxyalkylation susceptible it can be subjected to reaction with some other alkylene oxide than the instant reactant containing the two oxirane rings, such as ethylene oxide, propylene oxide, butylene oxide, styrene oxide, glycide, glycidyl ethers of methanol, ethanol, propanol, phenol, and the like. The fact that such reactants are oxyalkylation susceptible means they are also susceptible to reaction with imines, such as ethyleneimine, propyleneimine, etc. Furthermore, any non-nitrogenous compound which is oxyalkylation susceptible, for instance, an alcohol or a phenol, may be reacted with ethylene-imine to give suitable compounds to be employed as reactants in the present procedure. See, for example, U.S. Patent No. 2,318,729, dated May 11, 1943, to Wilson. This same procedure, of course, described in said Wilson patent can be used in conjunction with any alcohol or phenol. Indeed, water-soluble polymers of lower alkylene imines can be employed. See U.S. Patent No. 2,553,696, dated May 22, 1951, to Wilson. The imines may have ether linkages as previously noted. See, for example, the products described in U.S. Patent No. 2,325,514, dated July 27, 1943, to Hester.

As is obvious from what is said, one need not use organic compounds but inorganic compounds such as ammonia or hydrazine can be employed. In the case of amides, one is not limited to the amides of monocarboxy or polycarboxy acids but one may use sulfonamides or the amide of carbonic acid, i.e., urea. However, certain derivatives of urea appear more satisfactory than urea itself. See U.S. Patent No. 2,352,552, dated June 27, 1944, to Kienzle.

As to a variety of sulfonamides which are readily susceptible to oxyalkylation, particularly with ethylene oxide or propylene oxide, see U.S. Patent No. 2,577,256, dated December 4, 1951, to Lundsted. Such sulfonamide could be used as such or after treatment with one or more moles of ethylene oxide, propylene oxide, etc.

For purpose of convenience attention is directed to a sizable number of nitrogen-containing compounds which are available in the open market as differentiated from those which could be readily prepared by reaction with ethylene oxide, propylene oxide, ethyleneimine, etc. In some instances even these reactants, notwithstanding the fact that they do have a labile hydrogen atom, are more satisfactory after treatment with ethylene oxide so as to have the labile hydrogen atom attached to oxygen instead of nitrogen.

Amine 220 (Carbide and Carbon Chemicals Company, New York City, N.Y., designation for

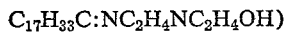

$C_{17}H_{33}C:NC_2H_4NC_2H_4OH)$

Amine 803 (Carbide and Carbon Chemicals Company, New York City, N.Y., designation for

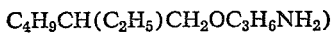

$C_4H_9CH(C_2H_5)CH_2OC_3H_6NH_2)$

Ethyl amine
Diethyl amine
Isopropyl amine
Diisopropyl amine
n-Butyl amine
Dibutyl amine
n-Hexyl amine
2-ethylhexyl amine
Di(2-ethylhexyl) amine
Ethylene diamine
Diethylene triamine
Triethylene tetramine
Tetraethylene pentamine
Propylene diamine
N-hydroxyethyl propylene diamine N,N-dihydroxyethyl ethylene diamine
2,5-dimethyl piperazine
Morpholine
N-hydroxyethyl morpholine
N-aminoethyl morpholine
N-aminopropyl morpholine
Monoethanolamine
Diethanolamine
Triethanolamine
N-methyl ethanolamine
Dimethyl ethanolamine
N-ethyl ethanolamine
N-ethyl diethanolamine
N-methyl diethanolamine
n-amylamine
Di-n-amylamine
sec-amylamine
Hexylamine
Dihexylamine
Heptylamine
Octylamine
Dioctylamine
Decylamine
Dodecylamine
Diethyl ethanolamine N-butyl diethanolamine
Aminoethyl ethanolamine
Di(2-ethylhexyl)ethanolamine
Tetraethanol ammonium hydroxide
N-acetyl ethanolamine
N,N-diethyl ethylene diamine
Monoisopropanolamine
Diisopropanolamine
Triisopropanolamine
Dimethyl isopropanolamine
Dibutyl isopropanolamine
1,3-diaminopropane
3-diethylaminopropylamine
1,3-diaminobutane
1,3-bis-ethylaminobutane
N-ethylbutylamine
2-amino-4-methylpentane
4-amino-2-butanol
1-dimethylamino-2-propanol
5-isopropylamino-1-pentanol
N-butylaniline High molecular weight aliphatic amides known as Armid 8, Armid 10, Armid 12, Armid 14, Armid 16, Armid 18, Armid HT, Armid RO, Armid T, Armid TO and Armid C, as described in a chemical pamphlet entitled "Armids," issued by Armour Chemical Division, Chicago 9, Illinois.

Similarly, secondary high molecular weight aliphatic amines known as Armeen 2C and Armeen 2HT, as described in circular entitled "Secondary Armeens," as issued by Armour Chemical Division, Chicago, Illinois.

Also, high molecular weight aliphatic amines known as Armeen 10, Armeen 16D, Armeen HTD, Armeen 18D, and Armeen CD, as described in a pamphlet entitled "Armeens," issued by Armour Chemical Division, Armour and Company, Chicago, Illinois.

Included also are fatty diamines having both primary and secondary amine groups and sold under the name Duomeens, such as Duomeen T, as described in a circular entitled "Duomeen T" issued by Armour Chemical Division, Chicago, Illinois.

Other suitable amines are primary monoamines of the type $H(OC_2H_4)_nNH_2$, where $n=3$ to 5.

Suitable amines having an aromatic ring include alpha-methylbenzylamine, alpha-methylbenzylmonoethanolamine and alpha-methylbenzyl diethanolamine.

One may use tertiary alkyl primary amines such as tertiary-octylamine, alkylamine 81-R, alkylamine 81-T, alkylamine JM-R, and alkylamine JM-T. As to a description of these amines see Rohm & Haas Company, Philadelphia, Pa., pamphlet entitled "Tertiary-Alkyl Primary Amines."

Other amines include:

2-amino-2-methyl-1-propanol
2-amino-2-methyl-1,3-propanediol
2-amino-2-ethyl-1,3-propanediol
3-amino-2-methyl-1-propanol
2-amino-1-butanol
3-amino-2,2-dimethyl-1-propanol
2-amino-2,3-dimethyl-1-propanol
2,2-diethyl-2-amino ethanol
2,2-dimethyl-2-amino ethanol
3-amino-1,2-butanediol
4-amino-1,2-butanediol
2-amino-1,3-butanediol
4-amino-1,3-butanediol
4,4-dimethyl-1,3-butanediol
2-amino-1,4-butanediol
3-amino-1,4-butanediol
1-amino-2,3-butanediol
Tris-(hydroxy methyl) amino methane An additional desirable group of amines are dialiphatic-aminoalkylcardanols, and particularly those having 10 to 40 carbon atoms in the dialiphatic grouping; examples include di-2-ethylhexylaminomethylcardanol, diamylaminomethyl cardanol, dilaurylaminomethyl cardanol, and di-n-butylaminomethyl cardanol. See U.S. Patent No. 2,489,672, dated November 29, 1949, to Revukas.

Further examples of this same type of material and which has available both a phenolic hydroxyl and an alkanol hydroxyl is illustrated by the condensation product derived from a phenol, either monofunctional or difunctional, such as para-tertiary butylphenol, para-tertiary amylphenol, octylphenol, nonylphenol, and similar phenols having a substituent such as two butyl groups or two nonyl groups in both an ortho and the para position. Such phenols are reacted with an aldehyde, such as formaldehyde, acetaldehyde, etc. and an alkanol phenol, such as diethanolamine, ethylethanolamine, dipropanolamine, and other amyl amines having only one amino hydrogen atom. See, for example, U.S. Patent No. 2,457,634, dated December 28, 1948, to Bond et al.

Amines having ring structures of course include aniline, diphenylamine, cyclohexylamine, dicyclohexylamine, and various comparable amines with alkyl substituents in the ring and similarly such amines after treatment with ethylene oxide, propylene oxide, glycide, etc.

It is to be noted, of course, that the above description in the text immediately preceding is largely miscellaneous in character because the reference is to products available in the open market. Practically every amine which is oxyalkylation susceptible is also acylation susceptible although there are some compounds, such as amides, sulfonamides, urea, etc., which are much more readily oxyalkylation susceptible than acylation susceptible for the reason that it is much more difficult to form a secondary amide, and more especially a tertiary amide, than it would be to react a primary amide with one or more moles of an alkylene oxide.

United States Patent 2,571,119, granted October 16, 1951, describes essentially the same compounds used for preparing the compositions used in practicing the present invention, and reference is made to that patent for a description of such nitrogen compounds, including imidazolines and oxyalkylated imidazolines, and their division into a number of classes.

It is to be understood that isomeric forms of the nitrogenous compounds of all 6 classes of this patent may be employed instead of the forms referred to, without departing from the invention.

Other amides, some of which are predominantly hydrophile and some of which are predominantly hydrophobe, also may be employed. Reference is made to U.S. Patents Nos. 2,181,929, 2,330,222, 2,356,565, 2,396,097 and 2,552,530. Examples of hydrophile amines include glucamine and maltosamine.

Particular reference is made to U.S. Patent No. 2,552,530, for the reason that it illustrates suitable amines in which the molecular weight may be as high as 4,000 to 10,000. Other amines may be obtained in a comparable fashion from monoamines as raw materials instead of polyamines as, for example, from triethanolamine. Similarly, types of materials can be obtained which are extremely hydrophile by oxyalkylation in the same manner using ethylene oxide or glycide. Generally speaking, however, it is our preference that the nitrogen-containing reactant has a molecular weight of less than 3,000 and generally less than 1,800.

PART 5

As has been pointed out previously, the reaction involved are essentially oxyalkylation reactions involving a nitrogen-containing compound (non-resinous) having at least one labile hydrogen atom.

If one employs a compound such as ammonia, which is a gas, the oxyalkylation procedure can be conducted in equipment of the kind which has been described for oxyethylation, except that the procedure is reversed in that the diglycidyl ether as such is dissolved in inert solvent with or without an added catalyst, such as 1% of sodium methylate, and is reacted by slowly passing in the reactive nitrogen-containing reactant, to wit ammonia. However, the most important phase of the instant invention is concerned with organic nitrogen derivatives which are invariably solids or liquids as distinguished from gases. Therefore, the reaction with the oxyalkylating agent, i.e., the diglycidyl ether or, in any event, the polyepoxide reactant as described, is conducted in an ordinary reaction vessel which need not have the usual modifications necessary when a gas, such as ethylene oxide, is used. Indeed, the reactions can be conducted readily in glass laboratory equipment such as the kind used for resin manufacture as described in a number of patents, as, for example, aforementioned U.S. Patent No. 2,499,365. All that is necessary is to put the reactants together and note whether the reaction goes without the presence of a catalyst. Generally speaking, if there is a basic nitrogen atom present reaction will take place. If the reaction does not take place, or takes place too slowly, then one need only repeat the experiment using a small amount of catalyst, for instance, about one, two or 3 percent of sodium methylate, or finely divided caustic soda. Any of the usual oxyalkylation catalysts can be employed. For obvious reasons, a basic catalyst is most desirable.

If the reaction proceeds too rapidly and an insoluble rubbery mass is obtained, the best procedure is simply to repeat the preparation with greater care and stop just short of the incipient gelation point and then determine if the reaction has gone to completion, or substantially so. In some instances when a reactant yields rubbery masses rather readily and there is no other objection to so doing, one is well advised to react the nitrogenous reactant with one or more moles of ethylene oxide and then use the oxyethylated derivative instead of the initial nitrogen-containing compound. As is also known, gelatin often can be prevented by introducing some other group, such as a cyclohexyl group, a phenyl group, or a long-chain aliphatic group at a point where possibly there are two reactive groups immediately adjacent, as in the case of the primary amine. Actually, the choice of reactants is so wide and so diverse that this probably presents no real or additional difficulty in the overwhelming majority of cases.

For purpose of convenience the following examples are included in tabular form in Table III, following. In those examples where the reactant was 3A as described in Table I, actually there may have been comparatively small amounts of higher polymers present which were ignored for purpose of convenience. In other words, the product actually may have had a small amount of the higher polymers described in Example B1 in Table II.

TABLE III

| Ex. No. | Reactants | Molar ratio | Time of reaction, hrs. | Max. temp., °C. | Color and physical state | Solubility |
|---|---|---|---|---|---|---|
| C1 [1] | Triethanolamine, 149.2 g. plus 3A 170 g. | 2:1 | 6 | 140 | Brown semi-solid | H₂O, insoluble; 5% acetic acid, soluble; xylene, soluble. |
| C2 | Tri-isopropanolamine, 94 g. plus 3A 85 g. | 2:1 | 8.5 | 180 | ___do___ | Do. |
| C3 | Dihydroxyethyl-ethylene diamine, 73 g. plus 3A 85 g. | 2:1 | 10 | 100 | Brownish semi-solid | Do. |
| C4 | Aniline, 93 g. plus 3A 170 g. | 2:1 | 5 | 90 | Amber-colored hard solid | H₂O, insoluble; 5% acetic acid, insoluble; xylene, insoluble; xylene plus CH₃OH, soluble. |
| C5 | Phenylethanolamine, 137 g. plus 3A 170 g. | 2:1 | 4.5 | 95 | Yellow-colored brittle hard solid. | Do. |
| C6 | Phenyldiethanolamine, 90.5 g. plus 3A 85 g. | 2:1 | 5 | 182 | Amber colored viscous liquid | H₂O, insoluble; 5% acetic acid, insoluble; xylene, soluble. |
| C7 | Ethylphenyl-ethanolamine, 62.5 g. plus 3A 64.6 g. | 2:1 | 14 | 150 | Dark amber colored liquid | Do. |
| C8 | Diphenylamine, 84.6 g. plus 3A 85 g. | 2:1 | 7 | 188 | Dark brown liquid | Do. |
| C9 | Morpholine, 87 g. plus 3A 170 g. | 2:1 | 7 | 138 | Dark amber solid mass | H₂O, insoluble; 5% acetic acid, soluble; xylene, soluble. |
| C10 | 1,3-dimethylurea, 88.1 g. plus 3A 170 g. | 2:1 | 8.5 | 205 | Dark amber-colored solid | H₂O, insoluble; 5% acetic acid, insoluble; xylene, insoluble; CH₃OH, soluble. |
| C11 | 1,3-diethylurea, 58.1 g. plus 3A 85 g. | 2:1 | 5.5 | 180 | Dark amber-colored hard mass. | H₂O, insoluble; 5% acetic acid, dispersible; xylene, soluble (hot). |
| C12 | Dibutylurea, 86 g. plus 3A 85 g. | 2:1 | 5.5 | 170 | Amber-colored viscous liquid | H₂O, insoluble; 5% acetic acid, dispersible; xylene, soluble. |
| C13 | a-Methylbenzyl ethanolamine, 82.5 g. plus 3A 85 g. | 2:1 | 7.5 | 156 | Brown hard mass | Do. |
| C14 | a-Methylbenzyl diethanolamine, 104.5 g. plus 3A 85 g. | 2:1 | 7.5 | 148 | Wine-red viscous liquid | H₂O, insoluble; 5% acetic acid, soluble; xylene, soluble. |

See footnote at end of table.

TABLE III—Continued

| Ex. No. | Reactants | Molar ratio | Time of reaction, hrs. | Max. temp., °C. | Color and physical state | Solubility |
|---|---|---|---|---|---|---|
| C15 | N-aminopropyl morpholine, 72 g. plus 3A 85 g. | 2:1 | 7.5 | 126 | Yellow sticky semi-solid | H₂O, insoluble; 5% acetic acid, soluble; xylene, soluble. |
| C16 | N-hydroxyethyl morpholine, 65.5 g. plus 3A 85 g. | 2:1 | 7.5 | 145 | Dark brown sticky semi-solid. | Do. |
| C17 | Cyclohexylamine, 99 g. plus 3A 170 g. | 2:1 | 9.5 | 142 | Dark brown semi-solid | H₂O, insoluble; 5% acetic acid, dispersible; xylene, soluble. |
| C18 | Di-2-ethylhexyl ethanolamine, 142.5 g. plus 3A 85 g. | 2:1 | 24 | 200 | Brownish thick liquid | Do. |
| C19 | Triethanolamine plus urea 1:4, 60 plus 100 g., 3A 68 g. | 2:1 | 4 | 150 | Yellow hard solid | H₂O, insoluble; 5% acetic acid, insoluble; xylene, insoluble; CH₃OH, soluble. |
| C20 | Triethanolamine plus propylene oxide 1:3, 161.5 g. plus 3A 85 g. | 2:1 | 2 | 150 | Dark brown sticky mass | H₂O, insoluble; 5% acetic acid, soluble; xylene, insoluble; xylene+CH₃OH, soluble. |
| C21 | Triethanolamine plus ethylene oxide 1:3, 140.5 g. plus 3A 85 g. | 2:1 | 2 | 150 | Brownish red thick liquid | H₂O, soluble; 5% acetic acid, soluble; xylene, insoluble; xylene+CH₃OH, soluble. |
| C22 | Triethanolamine plus ethylene oxide 1:6, 206.5 g. plus 3A 85 g. | 2:1 | 6.5 | 156 | Dark brown thick liquid | Do. |
| C23 | Triethanolamine plus propylene oxide 1:6, 248.5 g. plus 3A 85 g. | 2:1 | 6.5 | 157 | ___do___ | H₂O, insoluble; 5% acetic acid, soluble; xylene, partly soluble; xylene plus CH₃OH, soluble. |
| C24 | Triethanolamine plus ethylene oxide 1:9, 272.5 g. plus 3A 85 g. | 2:1 | 6.5 | 165 | ___do___ | H₂O, soluble; 5% acetic acid, soluble; xylene, insoluble; xylene plus CH₃OH, soluble. |
| C25 | Triethanolamine plus propylene oxide 1:9, 268.4 g. plus 3A 68 g. | 2:1 | 13 | 165 | ___do___ | H₂O, insoluble; 5% acetic acid, soluble; xylene, partly soluble; xylene plus CH₃OH, soluble. |
| C26 | 2-aminopyridine, 94 g. plus 3A 170 g. | 2:1 | 17 | 160 | Black hard solid | H₂O, insoluble; 5% acetic acid, soluble; xylene, insoluble; CH₃OH, soluble. |
| C27 | N-methyl aniline, 53.5 g. plus 3A 85 g. | 2:1 | 4 | 162 | Amber-colored semi-solid | H₂O, insoluble; 5% acetic acid, insoluble; xylene, soluble. |
| C28 | N-ethylaniline, 60.6 g. plus 3A 85 g. | 2:1 | 4 | 157 | Brown semi-solid | Do. |
| C29 | Ethyl diethanolamine, 68.5 g. plus 3A 85 g. | 2:1 | 4 | 147 | Brown rubbery mass | H₂O, insoluble; 5% acetic acid, soluble (difficult); xylene, soluble, partly; xylene plus CH₃OH, soluble. |
| C30 | Butyl diethanolamine, 82.5 g. plus 3A 85 g. | 2:1 | 4 | 163 | Dark brown thick liquid | H₂O, insoluble; 5% acetic acid, soluble; xylene, partly soluble; xylene plus CH₃OH, soluble. |
| C31 | Benzylamine, 53.6 g. plus 3A 85 g. | 2:1 | 3 | 176 | Yellow solid | H₂O, insoluble; 5% acetic acid, dispersible; xylene, partly soluble; xylene plus CH₃OH, soluble. |
| C32 | 2-amino-4-methyl pentane, 50.5 g. plus 3A 85 g. | 2:1 | 3 | 142 | Brownish solid | H₂O, insoluble; 5% acetic acid, dispersible; xylene, soluble. |
| C33 | 2-amino-2-ethyl 1,3-propanediol, 66.5 g. plus 3A 85 g. | 2:1 | 3 | 154 | Dark brown solid | H₂O, insoluble; 5% acetic acid, soluble; xylene, insoluble; xylene plus CH₃OH, soluble. |
| C34 | 2-amino-2-methyl 1,3-propanediol, 54.5 g. plus 3A 85 g. | 2:1 | 3 | 162 | Brown solid | H₂O, insoluble; 5% acetic acid, soluble; xylene, insoluble; xylene plus CH₃OH, soluble (difficult). |
| C35 | Diamylamine, 78.7 g. plus 3A 85 g. | 2:1 | 6 | 170 | Brown viscous liquid | H₂O, insoluble; 5% acetic acid, insoluble xylene, soluble. |
| C36 | Nonylamine, 71.7 g. plus 3A 85 g. | 2:1 | 6 | 170 | Yellow semi-solid | Do. |
| C37 | Di-2-ethyl hexylamine, 120.5 g. plus 3A 85 g. | 2:1 | 6 | 175 | Yellow viscous liquid | Do. |
| C38 | Furfurylamine, 97 g. plus 3A 170 g. | 2:1 | 6 | 170 | Dark brown semi-solid | H₂O, insoluble; 5% acetic acid, dispersible; xylene, soluble. |
| C39 | Ethylenediamine, 60 g. plus 3A 170 g. | 2:1 | 2.5 | 110 | Yellow semi-solid | H₂O, insoluble; 5% acetic acid, soluble; xylene, insoluble; xylene plus CH₃OH, soluble. |
| C40 | Propylene diamine, 74 g. plus 3A 170 g. | 2:1 | 2.5 | 112 | ___do___ | Do. |
| C41 | P-phenylene diamine, 54 g. plus 3A 85 g. | 2:1 | 6 | 162 | Black brittle solid | Do. |
| C42 | Diethylene triamine, 103.2 g. plus 3A 170 g. | 2:1 | 6 | 150 | Brownish semi-solid | H₂O, dispersible; 5% acetic acid, soluble, xylene, dispersible; xylene plus CH₃OH, soluble. |
| C43 | Tetraethylene pentamine, 94.7 g. plus 3A 85 g. | 2:1 | 4 | 150 | Amber-colored semi solid | Do. |
| C44 | Tetraethanol tetraethylene pentamine 182.7 g. plus 3A 85 g. | 2:1 | 4 | 145 | Dark amber colored semi-solid. | H₂O, dispersible 5% acetic acid, soluble; xylene, dispersible; xylene plus CH₃OH, soluble. |
| C45 | Nitrogen compound,² 141.6 g. plus 3A 51 g. | 2:1 | 5.5 | 180 | Dark brown brittle solid | H₂O, insoluble; 5% acetic acid, soluble; xylene, soluble. |
| C46 | Nitrogen compound,³ 206 g. plus 3A 34 g. | 2:1 | 5.5 | 83 | Dark amber colored thick fluid. | Do. |
| C47 | Triethanolamine plus Propylene oxide 1:12, 169 g. plus 3A 34 g. | 2:1 | 7 | 165 | Dark brown thick liquid | Do. |
| C48 | Triethanolamine plus ethylene oxide 1:12, 135.4 g. plus 3A 34 g. | 2:1 | 7 | 170 | Dark brown thick liquid | H₂O soluble; 5% acetic acid, soluble; xylene, soluble (partly); xylene plus CH₃OH, soluble. |
| C49 | Triethanolamine plus propylene oxide 1:18, 238.6 g. plus 3A 34 g. | 2:1 | 1.75 | 110 | Yellow thick liquid | H₂O, insoluble; 5% acetic acid, soluble; xylene, soluble. |
| C50 | Triethanolamine plus ethylene oxide 1:18, 188.2 g. plus 3A 34 g. | 2:1 | 2.5 | 160 | Dark brown thick liquid | H₂O, soluble; 5% acetic acid, soluble; xylene, soluble (cloudy); xylene plus CH₃OH, soluble. |
| C51 | Triethanolamine plus Propylene oxide 1:15, 203.8 g. plus 3A 34 g. | 2:1 | 2.5 | 157 | ___do___ | H₂O, dispersible; 5% acetic acid, soluble; xylene, soluble. |
| C52 | Triethanolamine plus ethylene oxide 1:15, 161.8 g. plus 3A 34 g. | 2:1 | 2.5 | 160 | ___do___ | H₂O, soluble; 5% acetic acid, soluble; xylene, soluble (cloudy); xylene plus CH₃OH, soluble. |
| C53 | Decylamine 10D, 78.5 g. plus 3A 85 g. | 2:1 | 8.5 | 172 | Light brown solid | H₂O, insoluble; 5% acetic acid, insoluble; xylene, soluble. |
| C54 | Dodecylamine 12D, 92.5 g. plus 3A 85 g. | 2:1 | 8.5 | 188 | ___do___ | Do. |
| C55 | Hexadecylamine 16D, 122 g. plus 3A 85 g. | 2:1 | 8.5 | 175 | ___do___ | Do. |
| C56 | Octadecylamine 18D, 133.5 g. plus 3A 85 g. | 2:1 | 8.5 | 174 | ___do___ | Do. |
| C57 | P-aminophenol, 54.5 g. plus 3A 85 g. | 2:1 | 8.0 | 175 | Black brittle solid | H₂O, soluble; 5% acetic acid; soluble; xylene, insoluble; xylene plus CH₃OH, soluble. |
| C58 | Beta-phenylethyl amine, 60.5 g. plus 3A 85 g. | 2:1 | 8.0 | 155 | Amber semisolid | H₂O, insoluble; 5% acetic acid, insoluble; xylene, soluble. |
| C59 | Benzenesulfonyl ethyl amide, 92.6 g. plus 3A 85 g. | 2:1 | 8.0 | 178 | Amber thick liquid | Do. |
| C60 | Benzene sulfonyl isopropylamide, 99.6 g. plus 3A 85 g. | 2:1 | 8.0 | 170 | ___do___ | Do. |

See footnotes at end of table.

TABLE III—Continued

| Ex. No. | Reactants | Molar ratio | Time of reaction (hrs.) | Max. temp., °C. | Color and physical state | Solubility |
|---|---|---|---|---|---|---|
| C61 | Benzene sulfonamide, 78.6 g. plus 3A 85 g. | 2:1 | 2.5 | 205 | Dark brown solid | $H_2O$, insoluble; 5% acetic acid, insoluble; xylene, insoluble; xylene plus $CH_3OH$, soluble. |
| C62 | P-toluene sulfonyl ethylamide, 99.7 g. plus 3A 85 g. | 2:1 | 2.5 | 190 | Amber thick liquid | $H_2O$, insoluble; 5% acetic acid, insoluble; xylene, soluble. |
| C63 | Armid 10,⁴ 86 g. plus 3A 85 g. | 2:1 | 8.0 | 170 | Brown solid | $H_2O$, insoluble; 5% acetic acid, insoluble; xylene, insoluble; xylene plus $CH_3OH$ soluble. |
| C64 | Armid 14,⁴ 57 g. plus 3A 43 g. | 2:1 | 8.0 | 175 | do | Do. |
| C65 | Armid 16,⁴ 64.5 g. plus 3A 43 g. | 2:1 | 8.0 | 190 | Yellow solid | Do. |
| C66 | Triethanolamine plus propylene oxide 1:133.8 g. plus 3A 17 g. | 2:1 | 5.0 | 175 | Dark brown liquid | $H_2O$, insoluble; 5% acetic acid, soluble; xylene, soluble. |
| C67 | Triethanolamine plus propylene oxide 1:27, 171.5 g. plus 3A 17 g. | 2:1 | 4.5 | 180 | do | Do. |
| C68 | Triethanolamine plus propylene oxide 1:30.2, 190 g. plus 3A 17 g. | 2:1 | 4.5 | 185 | do | Do. |
| C69 | Triethanolamine plus ethylene oxide 1:21.2, 108.2, g. plus 3A 17 g. | 2:1 | 4.5 | 190 | do | $H_2O$, soluble; 5% acetic acid, soluble; xylene plus alcohol, soluble. |
| C70 | Triethanolamine plus ethylene oxide 1:24.3, 121.8 g. plus 3A 17 g. | 2:1 | 4.5 | 180 | do | $H_2O$, soluble; 5% acetic acid, soluble; xylene plus alcohol (1:1 mix), soluble. |
| C71 | Triethanolamine plus ethylene oxide 1:26.9, 133.3 g. plus 3A 17 g. | 2:1 | 4.5 | 185 | do | Do. |
| C72 | Triethanolamine plus ethylene oxide 1:33.8, 163.6 g. plus 3A 17 g. | 2:1 | 4.5 | 180 | do | Do. |
| C73 | Furfurylamine plus propylene oxide 1:17.9, 113.5 g. plus 3A 17 g. | 2:1 | 2.0 | 175 | do | $H_2O$, insoluble; 5% acetic acid, soluble; xylene, soluble. |
| C74 | Furfurylamine plus propylene oxide 1:21, 131.5 g. plus 3A 17 g. | 2:1 | 2.0 | 160 | do | Do. |
| C75 | Furfurylamine plus propylene oxide 1:24, 148.9 g. plus 3A 17 g. | 2:1 | 2.0 | 180 | do | Do. |
| C76 | Furfurylamine plus propylene oxide 1:26.5, 163.4 g. plus 3A 17 g. | 2:1 | 2.0 | 195 | do | Do. |
| C77 | Furfurylamine plus propylene oxide 1:30.5, 186.6 g. plus 3A 17 g. | 2:1 | 1.0 | 175 | do | Do. |
| C78 | Furfurylamine plus propylene oxide 1:51.8, 155 g. plus 3A 9 g. | 2:1 | 1.0 | 185 | do | Do. |
| C79 | Tetraethylene pentamine plus propylene oxide 1:24.3, 160 g. plus 3A 17 g. | 2:1 | 2 | 190 | Dark brown thick liquid | $H_2O$, dispersible; 5% acetic acid, soluble; xylene, soluble. |
| C80 | Diethylene triamine plus propylene oxide 1:9.8, 134.4 g. plus 3A 34 g. | 2:1 | 0.5 | 120 | Brown thick liquid | Do. |
| C81 | Diethylene triamine plus propylene oxide 1:18.7, 118.8 g. plus 3A 17 g. | 2:1 | 0.5 | 147 | do | Do. |
| C82 | Triethylene tetramine plus propylene oxide 1:12, 85.2 g. plus 3A 17 g. | 2:1 | 0.5 | 95 | do | Do. |
| C83 | Triethylene tetramine plus propylene oxide 1:19.6, 128.4 g. plus 3A 17 g. | 2:1 | 0.5 | 95 | do | Do. |
| C84 | Propylene diamine plus propylene oxide 1:8.5, 564 g. plus 3A 17 g. | 2:1 | 1 | 108 | do | $H_2O$, insoluble; 5% acetic acid, soluble; xylene soluble. |
| C85 | Propylene diamine plus propylene oxide 1:10.3, 67 g. plus 3A 17 g. | 2:1 | 1 | 100 | Yellow thick liquid | Do. |
| C86 | Propylene diamine plus propylene oxide 1:20, 121 g. plus 3A 17 g. | 2:1 | 1 | 100 | do | Do. |
| C87 | Propylene diamine plus propylene oxide 1:25, 183 g. plus 3A 17 g. | 2:1 | 1 | 100 | do | Do. |
| C88 | Meta-phenylene diamine plus propylene oxide 1:11.7, 78.6 g. plus 3A 17 g. | 2:1 | 1.5 | 90 | Dark amber thick liquid | $H_2O$, insoluble; 5% acetic acid, dispersible; xylene, soluble. |
| C89 | Meta-phenylene diamine plus propylene oxide 1:27.6, 88.4 g. plus 3A 9 g. | 2:1 | 2 | 100 | do | Do. |
| C90 | Meta-phenylene diamine plus propylene oxide 1:43, 130 g. plus 3A 9 g. | 2:1 | 2 | 105 | do | Do. |
| C91 | Meta-phenylene diamine plus propylene oxide 1:55, 165 g. plus 3A 9 g. | 2:1 | 2 | 95 | do | Do. |
| C92 | Furfurylamine plus ethylene oxide plus propylene oxide 1:15.5:11.3, 143.4 g. plus 3A 17 g. | 2:1 | .75 | 100 | Brown thick liquid | $H_2O$, dispersible; 5% acetic acid, soluble; xylene, soluble. |
| C93 | Furfurylamine plus ethylene oxide plus propylene oxide 1:15.5:16.4, 173 g. plus 3A 17 g. | 2:1 | .75 | 100 | do | Do. |
| C94 | Furfurylamine plus ethylene oxide plus propylene oxide 1:15.5:23.5, 214.2 g. plus 3A 17 g. | 2:1 | 2 | 140 | do | Do. |
| C95 | Furfurylamine plus ethylene oxide plus propylene oxide 1:15.5:32.2, 264.7 g. plus 3A 17 g. | 2:1 | 2 | 130 | do | Do. |
| C96 | Cationic amine 220,⁵ 150 g. plus 3A 85 g. | 2:1 | 3 | 200 | Dark brown semi-solid | $H_2O$, insoluble; 5% acetic acid, soluble xylene, soluble. |

[1] 2% sodium methylate used as catalyst.
[2] Obtained by reaction from 2 moles butylphenol, 2 moles formaldehyde, and 1 mole dihydroxyethyl, ethylenediamine.
[3] Obtained by reaction from 1 mole amylphenol resin, 2 moles formaldehyde, and 2 moles diethanolamine.
[4] See previous reference to this material.
[5] Amine 220 is 1-hydroxyethyl-2-heptadecenyl glyoxalidine, a product of Carbide & Carbon Chemicals Corporation.

NOTE.—Products obtained by oxyalkylation of amines, involving either oxyethylation or oxypropylation, or both, are expressed in molal ratios of amine to alkylene oxide in this table and subsequent Table of Examples.

As previously pointed out one can use the product which is a mixture of the monomer derived from bisphenol A and corresponding to the previous formula of:

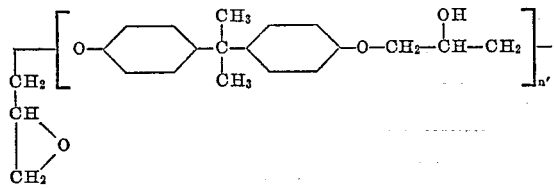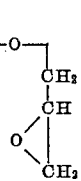

in which n varies from 1 to 3 and, as far as is possible to determine from molecular weight and hydroxyl value, etc., it corresponds approximately to the following composition:

75%—where n' is 0
12%—where n' is 1
8%—where n' is 2
5%—where n' is 3

The average molecular weight is 460 compared to 340 for the monomer (where n' is 0). However, the fact that the epoxide value, whether using pyridine hydrochloride dissolved in pyridine or in chloroform, is still definitely lower than one would expect, indicates beyond doubt the presence of some monoepoxide. In any event, a whole series of compounds has been made using this particular cogeneric mixture and assuming the molecular weight to be 462. The color and physical appearance of the products were substantially the same as in the case of Table III. The xylene solubility was at least as good as the corresponding compounds in Table III and the solubility in acetic acid was usually no better than, and perhaps not quite as good as the corresponding products in Table III. The data is again summarized for convenience in Table IV, following.

TABLE IV

| Ex. No. | Reactants | Molar ratio | Time of reaction, hrs. | Max. temp., °C. | Color and physical state | Solubility |
|---|---|---|---|---|---|---|
| E1 [1] | Triethanolamine, 149.2 g. plus B1 231 g. | 2:1 | 6 | 142 | Brownish semi-solid | H₂O, insoluble; 5% acetic acid, soluble; xylene, soluble. |
| E2 | Tri-isopropanolamine, 94 g. plus B1 116 g. | 2:1 | 8.5 | 183 | ___do___ | Do. |
| E3 | Dihydroxyethyl-ethylene diamine, 73 g. plus B1 116 g. | 2:1 | 10 | 102 | Brown semi-solid | Do. |
| E4 | Aniline, 93 g. plus B1 231 g. | 2:1 | 5 | 94 | Dark amber almost hard solid. | H₂O, insoluble; 5% acetic acid, insoluble; xylene, insoluble; xylene plus CH₃OH, soluble. |
| E5 | Phenylethanolamine, 137 g. plus B1 231 g. | 2:1 | 4.5 | 93 | Yellow brittle solid | Do. |
| E6 | Phenyldiethanolamine, 90.5 g. plus B1 116 g. | 2:1 | 5 | 179 | Dark amber viscous liquid | H₂O, insoluble; 5% acetic acid, insoluble; xylene, soluble. |
| E7 | Ethylphenylethanolamine, 62.5 g. plus B1 88 g. | 2:1 | 14 | 152 | Amber liquid | Do. |
| E8 | Diphenylamine, 84.6 g. plus B1 116 g. | 2:1 | 7 | 191 | Brown liquid | Do. |
| E9 | Morpholine, 87 g. plus B1 231 g. | 2:1 | 7 | 140 | Amber solid mass | H₂O, insoluble; 5% acetic acid, soluble; xylene, soluble. |
| E10 | 1,3-dimethyl urea, 88.1 g. plus B1 231 g. | 2:1 | 8.5 | 202 | Amber solid | H₂O, insoluble; 5% acetic acid, insoluble; xylene, insoluble; CH₃OH, soluble. |
| E11 | 1,3-diethyl urea, 58.1 g. plus B1 116 g. | 2:1 | 5.5 | 181 | Amber almost hard mass | H₂O, insoluble; 5% acetic acid, dispersible, xylene, soluble (hot). |
| E12 | Dibutylurea, 86 g. plus B1 116 g. | 2:1 | 5.5 | 172 | Dark amber thick liquid | H₂O, insoluble; 5% acetic acid, dispersible, xylene, soluble. |
| E13 | Alpha-methylbenzyl ethanolamine, 82.5 g. plus B1 116 g. | 2:1 | 7.5 | 155 | Brownish almost hard mass. | Do. |
| E14 | Alpha-methylbenzyl diethanolamine, 104.5 g. plus B1 116 g. | 2:1 | 7.5 | 150 | Red thick liquid | H₂O, insoluble; 5% acetic acid, soluble; xylene, soluble. |
| E15 | N-aminopropyl morpholine, 72 g. plus B1 116 g. | 2:1 | 7.5 | 129 | Amber viscous liquid | Do. |
| E16 | N-hydroxyethyl morpholine, 65.5 g. plus B1 116 g. | 2:1 | 7.5 | 144 | Amber viscous mass | Do. |
| E17 | Cyclohexylamine, 99 g. plus B1 231 g. | 2:1 | 9.5 | 143 | Brown almost hard solid | H₂O, insoluble; 5% acetic acid, dispersible; xylene, soluble. |
| E18 | Di-2-ethylhexyl ethanolamine, 142.5 g. plus B1 116 g. | 2:1 | 2.4 | 202 | Brown viscous liquid | Do. |
| E19 | Triethanolamine plus urea 1:4, 60 plus 100 g., plus B1 92.5 g. | 2:1 | 4 | 148 | Amber solid | H₂O, insoluble; 5% acetic acid, insoluble; xylene, insoluble; CH₃OH, soluble. |
| E20 | Triethanolamine plus propylene oxide 1:3, 161.5 g. plus B1 116 g. | 2:1 | 2 | 151 | Brown viscous mass | H₂O, insoluble; 5% acetic acid, soluble; xylene, insoluble; xylene plus CH₃OH, soluble. |
| E21 | Triethanolamine plus ethylene oxide 1:3, 140.5 g. plus B1 116 g. | 2:1 | 2 | 149 | Reddish brown viscous liquid. | H₂O, soluble; 5% acetic acid, soluble; xylene, insoluble; xylene plus CH₃OH, soluble. |
| E22 | Triethanolamine plus ethylene oxide 1:6, 206.5 g. plus B1 116 g. | 2:1 | 6.5 | 158 | Viscous brown liquid | Do. |
| E23 | Triethanolamine plus propylene oxide 1:6, 248.5 g. plus B1 116 g. | 2:1 | 6.5 | 155 | ___do___ | H₂O, insoluble; 5% acetic acid, soluble; xylene, partly soluble; xylene plus CH₃OH, soluble. |
| E24 | Triethanolamine plus ethylene oxyide 1:9, 272.5 g. plus B1 161 g. | 2:1 | 6.5 | 167 | Brown viscous mass | H₂O, soluble; 5% acetic acid, soluble; xylene, insoluble; xylene plus CH₃OH, soluble. |
| E25 | Triethanolamine plus prophylene oxide 1:9, 268.4 g. plus B1 92.5 g. | 2:1 | 13 | 162 | Thick brown liquid | H₂O, insoluble; 5% acetic acid, soluble; xylene, partly soluble; xylene plus CH₃OH, soluble. |
| E26 | 2-Aminopyridine, 94 g. plus B1 231 g. | 2:1 | 17 | 158 | Black hard mass | H₂O, insoluble; 5% acetic acid, soluble; xylene, insoluble; CH₃OH, soluble. |
| E27 | N-methyl aniline, 53.5 g. plus B1 116 g. | 2:1 | 4 | 165 | Yellowish viscous liquid | H₂O, insoluble; 5% acetic acid, insoluble; xylene, soluble. |
| E28 | N-ethyl aniline, 60.6 g. plus B1 116 g. | 2:1 | 4 | 160 | Brownish semi-solid | Do. |
| E29 | Ethyldiethanolamine, 68.5 g. plus B1 116 g. | 2:1 | 4 | 146 | Brown viscous mass | H₂O, insoluble; 5% acetic acid, soluble (difficult); xylene, partly soluble; xylene plus CH₃OH, soluble. |
| E30 | Butyldiethanolamine, 82.5 g. plus B1 116 g. | 2:1 | 4 | 160 | Thick brown liquid | H₂O, insoluble; 5% acetic acid, soluble; xylene, partly soluble; xylene plus CH₃OH, soluble. |
| E31 | Benzylamine, 53.6 g. plus B1 116 g. | 2:1 | 3 | 178 | Amber solid | H₂O, insoluble; 5% acetic acid, dispersible; xylene, partly soluble; xylene plus CH₃OH, soluble. |
| E32 | 2-amino-4-methyl pentane, 50.5 g. plus B1 116 g. | 2:1 | 3 | 143 | ___do___ | H₂O, insoluble; 5% acetic acid, dispersible; xylene, soluble. |

See footnotes at end of table.

TABLE IV—Continued

| Ex. No. | Reactants | Molar ratio | Time of reaction, hrs. | Max. temp., °C. | Color and physical state | Solubility |
|---|---|---|---|---|---|---|
| E33 | 2-amino-2-ethyl 1,3-propanediol, 66.5 g. plus B1 116 g. | 2:1 | 3 | 152 | Dark amber solid | $H_2O$, insoluble; 5% acetic acid, soluble; xylene, insoluble; xylene plus $CH_3OH$, soluble. |
| E34 | 2-amino-2-methyl 1,3-propanediol, 54.5 g. plus B1 116 g. | 2:1 | 3 | 160 | Amber solid | Do. |
| E35 | Diamylamine, 78.7 g. plus B1 116 g. | 2:1 | 6 | 173 | Amber thick liquid | $H_2O$, insoluble; 5% acetic acid, insoluble; xylene, soluble. |
| E36 | Nonylamine, 71.7 g. plus B1 116 g. | 2:1 | 6 | 169 | Amber viscous mass | Do. |
| E37 | Di-2-ethylhexylamine, 120.5 g. plus B1 116 g. | 2:1 | 6 | 171 | Amber thick liquid | Do. |
| E38 | Furfurylamine, 97 g. plus B1 231 g. | 2:1 | 6 | 168 | Dark amber mass | $H_2O$, insoluble; 5% acetic acid, dispersible; xylene, soluble. |
| E39 | Ethylene diamine, 60 g. plus B1 231 g. | 2:1 | 2.5 | 112 | Amber viscous mass | $H_2O$, insoluble; 5% acetic acid, soluble; xylene, insoluble; xylene plus $CH_3OH$, soluble. |
| E40 | Propylene diamine, 74 g. plus B1 231 g. | 2:1 | 2.5 | 114 | ___do___ | Do. |
| E41 | p-Phenylene diamine, 54 g. plus B1 116 g. | 2:1 | 6 | 160 | Dark brittle solid | Do. |
| E42 | Diethylene triamine, 103.2 g. plus B1 231 g. | 2:1 | 6 | 173 | Dark amber mass | $H_2O$, dispersible; 5% acetic acid, soluble; xylene, dispersible; xylene plus $CH_3OH$, soluble. |
| E43 | Tetraethylene pentamine, 94.7 g. plus B1 116 g. | 2:1 | 4 | 151 | Amber hard mass | Do. |
| E44 | Tetraethanol tetraethylene pentamine, 182.7 g. plus B1 116 g. | 2:1 | 4 | 148 | Darkish brown almost hard mass. | Do. |
| E45 | Nitrogen compound,[2] 141.6 g. plus B1 69 g. | 2:1 | 5.5 | 176 | Dark amber hard mass | $H_2O$, insoluble; 5% acetic acid, soluble; xylene, soluble. |
| E46 | Nitrogen compound,[3] 206 g. plus B1 46 g. | 2:1 | 5.5 | 85 | Viscous yellow liquid | Do. |
| E47 | Triethanolamine plus propylene oxide 1:12, 169 g. plus B1 46 g. | 2:1 | 7 | 166 | Viscous brown liquid | Do. |
| E48 | Triethanolamine plus ethylene oxide 1:2, 135.4 g. plus B1 46 g. | 2:1 | 7 | 172 | ___do___ | $H_2O$, soluble; 5% acetic acid, soluble; xylene, partly soluble; xylene plus $CH_3OH$, soluble. |
| E49 | Triethanolamine plus propylene oxide 1:18, 238.6 g. plus B1 46 g. | 2:1 | 1.75 | 112 | Viscous amber liquid | $H_2O$, insoluble; 5% acetic acid, soluble; xylene, soluble. |
| E50 | Triethanolamine plus ethylene oxide 1:18, 188.2 g. plus B1 46 g. | 2:1 | 2.5 | 158 | Dark amber viscous liquid | $H_2O$, soluble; 5% acetic acid, soluble; xylene, soluble but cloudy; xylene plus $CH_3OH$, soluble. |
| E51 | Triethanolamine plus propylene oxide 1:15, 203.8 g. plus B1 46 g. | 2:1 | 2.5 | 160 | Dark amber thick liquid | $H_2O$, dispersible; 5% acetic acid, soluble; xylene, soluble. |
| E52 | Triethanolamine plus ethylene oxide 1:15, 161.8 g. plus B1 46 g. | 2:1 | 2.5 | 158 | ___do___ | $H_2O$, soluble; 5% acetic acid, soluble; xylene, soluble (cloudy); xylene plus $CH_3OH$, soluble. |
| E53 | Decylamine 10D, 78.5 g. plus B1 115 g. | 2:1 | 8.5 | 170 | Amber mass | $H_2O$, insoluble; 5% acetic acid, insoluble; xylene, soluble. |
| E54 | Dodecylamine 12D, 92.5 g. plus B1 115 g. | 2:1 | 8.5 | 186 | ___do___ | Do. |
| E55 | Hexadecylamine 16D, 122 g. plus B1 115 g. | 2:1 | 8.5 | 172 | ___do___ | Do. |
| E56 | Octadecylamine 18D, 133.5 g. plus B1 115 g. | 2:1 | 8.5 | 176 | ___do___ | Do. |
| E57 | p-Aminophenol, 54.5 g. plus B1 115 g. | 2:1 | 8.0 | 173 | Almost black solid | $H_2O$, soluble; 5% acetic acid, soluble; xylene, insoluble; xylene plus $CH_3OH$, soluble. |
| E58 | Beta-phenyl ethylamine, 60.5 g. plus B1 115 g. | 2:1 | 8 | 150 | Brownish viscous mass | $H_2O$, insoluble; 5% acetic acid, insoluble; xylene, soluble. |
| E59 | Benzene sulfonyl ethylamide, 92.6 g. plus B1 115 g. | 2:1 | 8 | 175 | ___do___ | Do. |
| E60 | Benzene sulfonyl isopropylamide, 99.6 g. plus B1 115 g. | 2:1 | 8 | 173 | ___do___ | Do. |
| E61 | Benzene sulfonamide, 78.6 g. plus B1 115 g. | 2:1 | 2.5 | 202 | Dark brown solid mass | $H_2O$, insoluble; 5% acetic acid, insoluble; xylene, insoluble; xylene plus $CH_3OH$, soluble. |
| E62 | p-Toluene sulfonylethyl amide, 99.7 g. plus B1 115 g. | 2:1 | 2.5 | 188 | Yellow viscous liquid | $H_2O$, insoluble; 5% acetic acid, insoluble; xylene, soluble. |
| E63 | Armid 10,[4] 86 g. plus B1 115 g. | 2:1 | 8.0 | 168 | Dark amber mass | $H_2O$, insoluble; 5% acetic acid, insoluble; xylene, insoluble; xylene plus $CH_3OH$, soluble. |
| E64 | Armid 14,[4] 57 g. plus B1 58 g. | 2:1 | 8.0 | 172 | ___do___ | Do. |
| E65 | Armid 16,[4] 64.5 g. plus B1 58 g. | 2:1 | 8.0 | 189 | Amber solid | Do. |
| E66 | Triethanolamine plus propylene oxide 1:20.5, 133.8 g. plus B1 23 g. | 2:1 | 5.0 | 172 | Reddish brown liquid | $H_2O$, insoluble; 5% acetic acid, soluble; xylene, soluble. |
| E67 | Triethanolamine plus propylene oxide 1:27, 171.5 g. plus B1 23 g. | 2:1 | 4.5 | 181 | ___do___ | Do. |
| E68 | Triethanolamine plus propylene oxide 1:30.2, 190 g. plus B1 23 g. | 2:1 | 4.5 | 178 | ___do___ | Do. |
| E69 | Triethanolamine plus ethylene oxide 1:21.2, 108.2 g. plus B1 23 g. | 2:1 | 4.5 | 188 | ___do___ | $H_2O$, soluble; 5% acetic acid, soluble; xylene plus alcohol; (1:1 mix), soluble. |
| E70 | Triethanolamine plus ethylene oxide 1:24.3, 121.8 g. plus B1 23 g. | 2:1 | 4.5 | 178 | ___do___ | Do. |
| E71 | Triethanolamine plus ethylene oxide 1:26.9, 133.3 g. plus B1 23 g. | 2:1 | 4.5 | 182 | ___do___ | Do. |
| E72 | Triethanolamine plus ethylene oxide 1:33.8, 163.6 g. plus B1 23 g. | 2:1 | 4.5 | 183 | ___do___ | Do. |
| E73 | Furfurylamine plus propylene oxide 1:17.9, 113.5 g. plus B1 23 g. | 2:1 | 2.0 | 173 | ___do___ | $H_2O$, insoluble; 5% acetic acid, dispersible; xylene, soluble. |
| E74 | Furfurylamine plus propylene oxide 1:21, 131.5 g. plus B1 23 g. | 2:1 | 2.0 | 162 | ___do___ | Do. |
| E75 | Furfurylamine plus propylene oxide 1:24, 148.9 g. plus B1 23 g. | 2:1 | 2.0 | 178 | ___do___ | Do. |
| E76 | Furfurylamine plus propylene oxide 1:26.5, 163.4 g. plus B1 23 g. | 2:1 | 2.0 | 190 | ___do___ | Do. |
| E77 | Furfurylamine plus propylene oxide 1:30.5, 186.6 g. plus B1 23 g. | 2:1 | 1.0 | 177 | ___do___ | Do. |
| E78 | Furfurylamine plus propylene oxide 1:51.8, 155 g. plus B1 12.2 g. | 2:1 | 1.0 | 182 | Reddish liquid | Do. |

[1] 2% sodium methylate used as catalyst.
[2] Obtained by reaction from 2 moles butylphenol, 2 moles formaldehyde, and 1 mole dihydroxyethyl, ethylenediamine.
[3] Obtained by reaction from 1 mole amylphenol resin, 2 moles formaldehyde, and 2 moles diethanolamine.
[4] See previous reference to this material.

Previous attention has been directed to the fact that the diglycidyl ethers may not have any bridge connecting the aromatic nuclei, or the bridge may be derived from sulfur dichloride, from an aldehyde and particularly formaldehyde, or may be the residue of a sulfonic acid, i.e., a sulfone radical. There is no advantage in using these particular compounds as far as we have been able to determine and thus our preference has been to employ compounds where the bridge is derived from a ketone and particularly acetone, due in part to commercial availability. We have attempted to prepare comparatively technically pure compounds corresponding to some previously noted and which appear for convenience again in Table V immediately following. The method of preparation, of course, is obvious in light of what has been said previously, or what has been described elsewhere in the literature.

As has been pointed out previously, our preference is to use compounds having at least one basic nitrogen and in many cases a repetitious ether linkage obtained by oxyalkylation. The following derivatives were obtained in the same manner as described previously in connection with diglycidyl ethers where the bridge between the phenolic nuclei happened to be, in most cases, from a ketone.

TABLE V

| Ex. No. | Structure | Formula |
|---|---|---|
| F1 | $H_2C-\underset{H}{\overset{O}{C}}-CH_2O-C_6H_4-C_6H_4-O-CH_2-\underset{H}{\overset{O}{C}}-CH_2$ | $C_{18}H_{18}O_4$ (M.W. 298) |
| F2 | Bis(amylphenol) sulfide diglycidyl ether | $C_{28}H_{38}O_4S$ (M.W. 470) |
| F3 | Bis(diamylphenol) methane diglycidyl ether | $C_{39}H_{60}O_4$ (M.W. 592) |
| F4 | $CH_2-CH-CH_2-O-C_6H_4-SO_2-C_6H_4-O-CH_2-CH-CH_2$ (with epoxide groups) | $C_{18}H_{18}O_6S$ (M.W. 362) |

TABLE VI

| Ex. No. | Reactants | Molar ratio | Time of reaction, hrs. | Max. temp., °C. | Color and physical state | Solubility |
|---|---|---|---|---|---|---|
| G1 | Triethanolamine, 149.2 g. plus F1 149 g. | 2:1 | 6 | 145 | Brown semisolid | H₂O, insoluble; 5% acetic acid, soluble; xylene, soluble. |
| G2 | Tri-isopropanolamine, 94 g. plus F1 74.5 g. | 2:1 | 8 | 185 | do | H₂O, soluble; 5% acetic acid, soluble; xylene, soluble. |
| G3 | Furfurylamine, 97 g. plus F1 149 g. | 2:1 | 6 | 180 | Dark brown semisolid | H₂O, insoluble; 5% acetic acid, dispersible; xylene, soluble. |
| G4 | Triethanolamine plus ethylene oxide 1:18, 188.2 g. plus F1 29.8 g. | 2:1 | 2 | 155 | Dark brown thick liquid | H₂O, soluble; 5% acetic acid, soluble; xylene, soluble (cloudy); xylene plus CH₃OH, soluble. |
| G5 | Furfurylamine plus propylene oxide 1:17.9, 113.5 g. plus F1 14.9 g. | 2:1 | 2 | 170 | do | H₂O, insoluble; 5% acetic acid, soluble; xylene, soluble. |
| G6 | Triethanolamine, 74.6 g. plus F2 117.5 g. | 2:1 | 5 | 140 | Dark semisolid | Do. |
| G7 | Tri-isopropanolamine, 94 g. plus F2 117.5 g. | 2:1 | 6 | 165 | do | Do. |
| G8 | Furfuryl amine, 97 g. plus F2 235 g. | 2:1 | 6 | 170 | do | H₂O, insoluble; 5% acetic acid, dispersible; xylene, soluble. |
| G9 | Triethanolamine plus ethylene oxide 1:18, 188.2 g. plus F2 47 g. | 2:1 | 2 | 150 | Dark thick liquid | H₂O, soluble; 5% acetic acid, soluble; xylene, soluble (cloudy); xylene plus CH₃OH, soluble. |
| G10 | Furfurylamine plus propylene oxide 1:17.9, 113.5 g. plus F2 23.5 g. | 2:1 | 2 | 165 | do | H₂O, insoluble; 5% acetic acid, soluble; xylene, soluble. |
| G11 | Triethanolamine, 74.6 g. plus F3 148 g. | 2:1 | 3 | 140 | Dark semisolid | Do. |
| G12 | Tri-isopropanolamine, 94 g. plus F3 148 g. | 2:1 | 3 | 150 | do | Do. |
| G13 | Furfurylamine, 97 g. plus F3 296 g. | 2:1 | 4 | 165 | do | H₂O, insoluble; 5% acetic acid, dispersible; xylene, soluble. |
| G14 | Triethanolamine plus ethylene oxide 1:18, 188.2 g. plus F3 59.2 g. | 2:1 | 2 | 150 | Dark thick liquid | H₂O, dispersible; 5% acetic acid, soluble; xylene, soluble (cloudy); xylene plus CH₃OH, soluble. |

TABLE VI—Continued

| Ex. No. | Reactants | Molar ratio | Time of reaction (hrs.) | Max. temp., °C. | Color and physical state | Solubility |
|---|---|---|---|---|---|---|
| G15 | Furfurylamine plus propylene oxide 1:17.9, 113.5 g. plus F3 29.6 g. | 2:1 | 2 | 160 | Dark thick liquid | $H_2O$, insoluble; 5% acetic acid, soluble (hot); xylene, soluble. |
| G16 | Triethanolamine, 149.2 g. plus F4 181 g. | 2:1 | 6 | 150 | Dark semisolid | $H_2O$, insoluble; 5% acetic acid, soluble; xylene, soluble. |
| G17 | Tri-isopropanolamine, 94 g. plus F4 90.5 g. | 2:1 | 7 | 180 | ___do___ | Do. |
| G18 | Furfurylamine, 97 g. plus F4 181 g. | 2:1 | 6 | 180 | ___do___ | $H_2O$, insoluble; 5% acetic acid, dispersible; xylene, soluble. |
| G19 | Triethanolamine plus ethylene oxide 1:18, 188.2 g. plus F4 36.2 g. | 2:1 | 2 | 160 | Dark thick liquid | $H_2O$, soluble; 5% acetic acid, soluble; xylene, soluble (cloudy); xylene plus $CH_3OH$, soluble. |
| G20 | Furfurylamine plus propylene oxide 1:17.9, 113.5 g. plus F4 18.1 g. | 2:1 | 2 | 165 | ___do___ | $H_2O$, insoluble; 5% acetic acid, soluble; xylene, soluble. |

For reasons which are obvious in light of what has been said previously, the majority of examples, in fact all prior examples, are concerned with instances where the ratio of the amine reactant to the polyepoxide is two-to-one. One reason is that the epoxide is usually the most expensive reactant and, everything else being equal, one attempts to obtain the best results with the least amount of the more, or most expensive, reactant. This ratio need not be employed. Other obvious ratios can be used; for instance, one may use a ratio of one-to-one, provided, of course, that the amine preferably has at least two reactive hydrogen atoms. If the amine does not have at least two reactive hydrogen atoms, one mole of the epoxide may react and make available a new labile hydrogen atom which is then susceptible to further reaction. On the other hand, if the amine reactant has two or more labile hydrogen atoms then it becomes evident that one produces not only a linear type polymer but also that cross-linking may take place between two linear polymers so as to produce an insoluble, or semi-insoluble mass suggestive of gelation or incipient thermosetting action, or one may even obtain a hard type of resin suitable only for purposes other than those herein described and perhaps be useless for any purpose.

Note in the table following, i.e., Table VII, the materials obtained in the manner described in this table use a molal ratio of one-to-one. The reaction masses become semi-resinous and give solutions which usually are either almost insoluble in water, or are dispersible to a modest degree at least, but which are somewhat more dispersible in dilute acid. They are also soluble or dispersible as a rule in xylene or a mixture of xylene and methyl alcohol (one-to-one). The products obtained were comparatively thick liquids and indicated that the molecular size was considerably higher in proportion than comparable compounds obtained by the two-to-one ratio. Such materials tend in the direction of potential insolubility and are particularly desirable for the reason that they adsorb rapidly at the interface. Likewise, when converted into new compounds by oxyethylation, oxypropylation, acylation, or similar processes, the resultant of reaction has these same properties to an equal or greater degree.

TABLE VII

| Ex. No. | Reactants | Molar ratio | Time of reaction, hrs. | Max. temp., °C. | Color and physical state | Solubility |
|---|---|---|---|---|---|---|
| H1 | Triethanolamine plus propylene oxide 1:18, 119.3 g. plus 3A 34 g. | 1:1 | 1.5 | 150 | Yellow thick liquid | $H_2O$, insoluble; 5% acetic acid, dispersible; xylene plus $CH_3OH$, dispersible. |
| H2 | Furfurylamine plus propylene oxide 1:51.8, 155 g. plus 3A 17 g. | 1:1 | 1.0 | 150 | Brown thick liquid | Do. |
| H3 | Furfurylamine plus propylene oxide 1:66.8, 199 g. plus 3A 17 g. | 1:1 | 2.0 | 165 | Yellow thick liquid | Do. |
| H4 | Furfurylamine plus ethylene oxide plus propylene oxide 1:15.5:9, 130 g. plus 3A 34 g. | 1:1 | 2.0 | 90 | Dark liquid | $H_2O$, dispersible; 5% acetic acid, soluble; xylene plus $CH_3OH$, soluble. |
| H5 | Triethylene tetramine plus propylene oxide 1:12, 41.3 g. plus 3A 17 g. | 1:1 | 1.0 | 115 | Brownish thick liquid | $H_2O$, insoluble; 5% acetic acid, dispersible; xylene plus $CH_3OH$, soluble. |
| H6 | Propylenediamine plus propylene oxide 1:10.3, 67 g. plus 3A 34 g. | 1:1 | 1.5 | 135 | Yellow thick liquid | Do. |
| H7 | Meta-phenylene diamine plus propylene oxide 1:27.6, 85.4 g. plus 3A 17 g. | 1:1 | 1.5 | 120 | Dark brown thick liquid | Do. |
| H8 | Diethylene triamine plus propylene oxide 1:18.7, 59.4 g. plus 3A 17 g. | 1:1 | 1.5 | 130 | Brown thick liquid | Do. |
| H9 | Furfurylamine plus ethylene oxide plus propylene oxide 1:15.5:11.3, 143.4 g. plus 3A 34 g. | 1:1 | .5 | 100 | ___do___ | $H_2O$, dispersible; 5% acetic acid, soluble; xylene, soluble. |
| H10 | Furfurylamine plus ethylene oxide plus propylene oxide 1:15.5:16.4, 173 g. plus 3A 34 g. | 1:1 | 1 | 100 | ___do___ | Do. |
| H11 | Furfurylamine plus ethylene oxide plus propylene oxide 1:15.5:23.5, 214.2 g. plus 3A 34 g. | 1:1 | 1 | 100 | ___do___ | Do. |
| H12 | Furfurylamine plus ethylene oxide plus propylene oxide 1:15.5:32.2, 264.6 g. plus 3A 34 g. | 1:1 | 1 | 100 | ___do___ | Do. |

PART 6

The preparation of the compounds or products described in Part 5, preceding, involves an oxyalkylating agent, to wit, a polyepoxide and usually a diepoxide. The procedure described in the present part is a further oxyalkylation step but involves the use of a monoepoxide or the equivalent. The principal difference is only that while polyepoxides are invariably nonvolatile and can be reacted under a condenser, at least numerous monoepoxides and particularly ethylene oxide, propylene oxide, butylene oxide, etc., involve somewhat different operating conditions. Glycide and methylglycide react under practically the same conditions as the polyepoxide. Actually, for purpose of convenience, it is most desirable to conduct the previous reaction, i.e., the one involving the polyepoxide, in equipment such that subsequent reaction with monoepoxides may follow without interruption. For this reason considerable is said in detail as to oxyethylation, etc.

As the oxyalkylation procedure is substantially conventional, and carried out in equipment of the type commonly used for oxyalkylation, the procedure will simply be illustrated by the following examples:

*Example J1*

The oxyalkylation-susceptible compound employed was the resin previously described as Example E1. Example E1, in turn, was obtained from triethanolamine and Example B1 as described in Table II. The autoclave employed in this particular instance was approximately 5 gallons in size. In other instances somewhat larger autoclaves have been used, for instance, 10, 25 or 35 gallon sizes. However, this is immaterial. 8.5 pounds of oxyalkylation-susceptible compound E1 were placed in the autoclave along with an equal amount of solvent. In this series of examples the solvent employed was xylene. This applies to the series appearing in subsequent Table VIII with the exception that the series derived from oxyalkylation-susceptible compound E3 used as solvent a 50–50 mixture of xylene and diethyleneglycol diethyl ether. The amount of catalyst used (finely powdered caustic soda) was .8 pound. Adjustment was made to operate the autoclave at approximately 125° C. In some other instances higher temperatures were employed, up to 130° C. or 145° C. or 150° C. Adjustment was made also to operate at a pressure not in excess of 30 pounds per square inch. The time regulator was set so as to inject 8.5 pounds of ethylene oxide slowly over a one-hour period. The reaction went readily and, as a matter of fact, the oxide was taken up probably in considerably less than this time. The speed of reaction, particularly at the comparatively low pressure, undoubtedly was due in a large measure to effective agitation and also to the comparatively high concentration of catalyst. The theoretical molecular weight at the end of the reaction was 1700. The molal ratio of ethylene oxide to oxyalkylation-susceptible compound (i.e., the initial resin) was 19.25 to 1.

*Example J2*

This example illustrates further oxyalkylation of Example J1, preceding. The oxyalkylation-susceptible compound, to wit, E1, is the same as was used in Example J1, because it was merely a continuation. In subsequent examples, such as for example listed in Table VIII, the oxyalkylation-susceptible compound shown in the horizontal line concerned with Example J2 refers to oxyalkylation-susceptible compound E1. Actually, one could refer just as properly to Example J1 at this stage. It is immaterial which designation is used so long as its use is practiced consistently throughout the tables. In any event, the amount of ethylene oxide used is the same as before, to wit, 8.5 pounds. This means the oxide at the end was 17 pounds. Similarly, the ratio of ethylene oxide to oxyalkylation-susceptible compound (molar basis) at the end was 38.5 to 1. The theoretical molecular weight was 2544. There was no added solvent. Similarly, there was no added catalyst. The time period was slightly more than one hour, to wit, 1½ hours.

In all succeeding examples the temperature and pressure were the same as previously, to wit, 125° C. to 130° C., and not over 15 pounds per square inch. The time element varied somewhat as noted in succeeding examples.

*Example J3*

The oxyethylation proceeded in the same manner as described in Example J1 and J2, preceding. There was no added solvent and no added catalyst. The oxide added was one-half of the previous amount, to wit, 4.25 pounds. The total oxide at the end of the oxyalkylation procedure was 21.25 pounds. The molal ratio of oxide to condensate was 48 to 1. The theoretical molecular weight was 2970. As noted previously, the conditions in regard to temperature and pressure were the same as in regard to Examples 1b and 2b. The time period was a little shorter than before, to wit, ¾ hour.

*Example J4*

The oxyethylation was continued and the amount of oxide added was the same as before, to wit, 4.25 pounds. The amount of oxide added at the end of the reaction was 25.5 pounds. There was no added solvent and no added catalyst. Conditions as far as temperature and pressure were concerned were the same as in previous examples. The time period was one hour. The molal ratio of oxide to oxyalkylation-susceptible compound was 57.8 to 1. The theoretical molecular weight was 3390.

*Example J5*

The oxyethylation was continued with the addition of another 4.25 pounds of oxide. No added solvent was introduced and likewise no added catalyst was introduced. The theoretical molecular weight at the end of the reaction was 3812. The molal ratio of oxide to oxyalkylation-susceptible compound was 67.5 to 1. The time period was one hour. The total amount of oxide at the end of the period was 29.75.

*Example J6*

The oxyalkylation was continued with the addition of the same amount of oxide as before (4.25 pounds.). There was no added solvent and no added catalyst. The amount of oxide in at the end of the reaction period was 34 pounds. The theoretical molecular weight was 4230 and the ratio of oxide to oxyalkylation-susceptible compound was 77 to 1. The time period was a little longer than previously, to wit, 1½ hours.

The same procedure as described in the previous examples was employed in connection with a number of the other condensations described previously. All these data have been presented in tabular form in Tables VIII through X.

In substantially every case a 35-gallon autoclave was employed, although in some instances the initial oxyethylation was started in a 15-gallon autoclave and then transferred to a 25-gallon autoclave, or at times to the 35-gallon autoclave. This is immaterial but happened to be a matter of convenience only. The solvent used in all cases was xylene. The catalyst used was finely powdered caustic soda.

Referring to Tables VIII, IX, and X, it will be noted that compounds J1 through J18 were obtained by the use of ethylene oxide, whereas Examples J19 through J36 were obtained by the use of propylene oxide; and Example J37 through J54 were obtained by the use of butylene oxide.

Referring now to Table IX specifically, it will be noted that the series of examples beginning with K1 were obtained, in turn, by use of both ethylene and propylene oxides, using ethylene first; in fact, using Examples J4 as the oxyalkylation-susceptible compound in the first 6 examples. This applies to series K1 through K18.

Similarly, series K19 through K34 involve the use of both propylene oxide and ethylene oxide in which the propylene oxide was used first, to wit, K19 was prepared from J24, a compound which was initially derived by use of propylene oxide.

Similarly, Examples K37 through K54 involve the use of ethylene oxide and butylene oxide, the ethylene oxide being used first. Also, these two oxides were used in the series K55 through K72, but in this latter instance the butylene oxide was used first and then the ethylene oxide.

Series K73 through K90 involve the use of propylene oxide and butylene oxide, butylene oxide being used first and propylene oxide being used next.

In series L1 through L18 the three oxides were used. It will be noted in Example L1 the initial compound was K78; Example K78, in turn, was obtained from a compound in which butylene oxide was used initially and then propylene oxide. Thus, the oxide added in the series L1 through L6 was by use of ethylene oxide as indicated in Table X.

Referring to Table X, in regard to Example L19 it will be noted again that the three oxides were used and L19 was obtained from K57. Example K57, in turn, was obtained by using butylene oxide first and then ethylene oxide. In Example L19 and subsequent examples, such as L20, L21, etc., propylene oxide was added.

Tables XI, XII, XIII give the data in regard to the oxyalkylation procedure as far as temperature and pressure are concerned and also give some data as to solubility of the oxyalkylated derivative in water, xylene and kerosene.

Referring to Table VIII in greater detail, the data are as follows: The first column gives the example numbers, such as J1, J2, J3, etc., etc.; the second column gives the oxyalkylation-susceptible compound employed which, as previously noted in the series J1 through J6, is Example E1, although it would be just as proper to say that in the case of J2 the oxyalkylation-susceptible compound was J1, and in the case of J3 the oxyalkylation-susceptible compound was J2. Actually, reference is to the parent derivative for the reason that the figure stands constant and probably leads to a more convenient presentation. Thus, the third column indicates the epoxide-derived condensate previously referred to.

The fourth column shows the amount of ethylene oxide in the mixture prior to the particular oxyethylation step. In the case of Example J1 there is no oxide used but it appears, of course, in J2, J3, and J4, etc.

The fifth column can be ignored for the reason that it is concerned with propylene oxide only, and the sixth column can be ignored for the reason that it is concerned with butylene oxide only.

The seventh column shows the catalyst which is invariably powdered caustic soda. The quantity used is shown.

The eighth column shows the amount of solvent which is xylene unless otherwise stated.

The ninth column shows the oxyalkylation-susceptible compound which in this series is a polyepoxide-derived nitrogen compound.

The tenth column shows the amount of ethylene oxide in at the end of the particular step.

Column eleven shows the same data for propylene oxide and column twelve shows data for butylene oxide. For obvious reasons these can be ignored in the series J1 through J18.

Column thirteen shows the amount of the catalyst at the end of the oxyalkylation step, and column fourteen shows the solvent at the end of the oxyalkylation step.

The fifteenth, sixteenth and seventeenth columns are concerned with molal ratio of the individual oxide to the oxyalkylation-susceptible compound. Data appears only in column fifteen for the reason, previously noted, that no butylene or propylene oxide were used in the present instance.

The theoretical molecular weight appears at the end of the table which is on the assumption, as previously noted, as to the probable molecular weight of the initial compound, and on the assumption that all oxide added during the period combined. This is susceptible to limitations that have been pointed out elsewhere, particularly in the patent literature.

Referring now to the second series of compounds in Table VIII, to wit, Examples J19 through J36, the situation is the same except that it is obvious that the oxyalkylating agent used was propylene oxide and not ethylene oxide. Thus, the fourth column becomes a blank and the tenth column becomes a blank and the fifteenth column becomes a blank, but column five, which previously was a blank in Table VIII, now carries data as to the amount of propylene oxide present at the beginning of the reaction. Column eleven carries data as to the amount of propylene oxide present at the end of the reaction, and column sixteen carries data as to the ratio of propylene oxide to the oxyalkylation-susceptible compound. In all other instances the various headings have the same significance as previously.

Similarly, referring to Examples J37 through J54 in Table VIII, columns four and five are blanks, columns ten and eleven are blanks, and columns fifteen and sixteen are blanks, but data appear in column six as to butylene oxide present before the particular oxyalkylation step. Column twelve gives the amount of butylene oxide present at the end of the step, and column seventeen gives the ratio of butylene oxide to oxyalkylation-susceptible compound.

Table IX is in essence the data presented in exactly the same way except the two oxides appear, to wit, ethylene oxide and propylene oxide. This means that there are only three columns in which data does not appear, all three being concerned with the use of butylene oxide. Furthermore, it shows which oxide was used first by the very fact that reference to Example K1, in turn, refers to J4, and also shows that ethylene oxide was present at the very first stage. Furthermore, for ease of comparison and also to be consistent, the data under Molal Ratio in regard to ethylene oxide and propylene oxide goes back to the original diepoxide-derived compound E1. This is obvious, of course, because the figures 57.8 and 14.6 coincide with the figures for J4 derived from E1 as shown in Table VIII.

In Table IX the same situation is involved except, of course, propylene oxide is used first and this, again, is perfectly apparent. Three columns only are blank, to wit, the three referring to butylene oxide. The same situation applies in examples such as K37 and subsequent examples where the two oxides used are ethylene oxide and butylene oxide and the table makes it plain that ethylene oxide was used first. Inversely, Example K55 and subsequent examples show the use of the same two oxides but with butylene oxide being used first as shown on the table.

Example K73 and subsequent examples relate to the use of propylene oxide and butylene oxide. Examples beginning with L1, Table X, show the use of all three oxides so there are no blanks as in the first step of each stage where one oxide is missing. It is not believed any further explanation need be offered in regard to Table X.

As previously pointed out certain initial runs using one oxide only, or in some instances two oxides, had to be duplicated when used subsequently for further reaction. It would be confusing to refer to too much detail in these various tables for the reason that all the data appear in considerable detail and is such that all results can be readily shown.

Reference to solvent and amount of alkali at any point takes into consideration the solvent from the previous step and the alkali left from this step. As previously pointed out, Tables XI, XII and XIII give operating data in connection with the entire series, comparable to what has been said in regard to Examples J1 through J6.

The products resulting from these procedures may contain modest amounts, or have small amounts, of the solvents as indicated by the figures in the Tables. If desired, the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i.e., not attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propllene oxide; or, one could use a combination in which butylene oxide is used along with either one of the two oxides, just mentioned, or a combination of both of them.

The same would be true in regard to a mixture of ethylene oxide and butylene oxide, or butylene oxide and propylene oxide.

The colors of the products usually vary from a reddish amber tint to a definitely red, and amber or a straw color, or even a pale straw color. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the products. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE VIII

| Ex. No. | OSC, ex. No. | Composition before | | | | | | Composition at end | | | | | | | | |
|---|---|---|---|---|---|---|---|---|---|---|---|---|---|---|---|---|
| | | OSC, lbs. | Oxides | | | Catalyst, lbs. | Solvent, lbs. | OSC, lbs. | Oxides | | | Catalyst, lbs. | Solvent, lbs. | Molal ratio | | | Theo. mol. wt. |
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| J1 | E1 | 8.5 | | | | 0.8 | 8.5 | 8.5 | 8.5 | | | 0.8 | 8.5 | 19.25 | | | 1,696 |
| J2 | E1 | 8.5 | 8.5 | | | 0.8 | 8.5 | 8.5 | 17.0 | | | 0.8 | 8.5 | 38.5 | | | 2,544 |
| J3 | E1 | 8.5 | 17.0 | | | 0.8 | 8.5 | 8.5 | 21.25 | | | 0.8 | 8.5 | 48.2 | | | 2,968 |
| J4 | E1 | 8.5 | 21.25 | | | 0.8 | 8.5 | 8.5 | 25.50 | | | 0.8 | 8.5 | 57.8 | | | 3,388 |
| J5 | E1 | 8.5 | 25.5 | | | 0.8 | 8.5 | 8.5 | 29.75 | | | 0.8 | 8.5 | 67.5 | | | 3,812 |
| J6 | E1 | 8.5 | 29.75 | | | 0.8 | 8.5 | 8.5 | 34.0 | | | 0.8 | 8.5 | 77.1 | | | 4,232 |
| J7 | E2 | 9.5 | | | | 0.8 | 9.5 | 9.5 | 9.5 | | | 0.8 | 9.5 | 21.1 | | | 1,860 |
| J8 | E2 | 9.5 | 9.5 | | | 0.8 | 9.5 | 9.5 | 19.0 | | | 0.8 | 9.5 | 42.2 | | | 2,790 |
| J9 | E2 | 9.5 | 19.0 | | | 0.8 | 9.5 | 9.5 | 23.75 | | | 0.8 | 9.5 | 52.75 | | | 3,255 |
| J10 | E2 | 9.5 | 23.75 | | | 0.8 | 9.5 | 9.5 | 28.5 | | | 0.8 | 9.5 | 63.3 | | | 3,720 |
| J11 | E2 | 9.5 | 28.5 | | | 0.8 | 9.5 | 9.5 | 33.25 | | | 0.8 | 9.5 | 73.85 | | | 4,185 |
| J12 | E2 | 9.5 | 33.25 | | | 0.8 | 9.5 | 9.5 | 38.0 | | | 0.8 | 9.5 | 84.4 | | | 4,650 |
| J13 | E3 | 8.5 | | | | 0.8 | 8.5 | 8.5 | 8.5 | | | 0.8 | 8.5 | 19.2 | | | 1,688 |
| J14 | E3 | 8.5 | 8.5 | | | 0.8 | 8.5 | 8.5 | 17.0 | | | 0.8 | 8.5 | 33.4 | | | 2,532 |
| J15 | E3 | 8.5 | 17.0 | | | 0.8 | 8.5 | 8.5 | 21.25 | | | 0.8 | 8.5 | 48.0 | | | 2,954 |
| J16 | E3 | 8.5 | 21.25 | | | 0.8 | 8.5 | 8.5 | 25.5 | | | 0.8 | 8.5 | 57.6 | | | 3,376 |
| J17 | E3 | 8.5 | 25.5 | | | 0.8 | 8.5 | 8.5 | 29.75 | | | 0.8 | 8.5 | 67.2 | | | 3,798 |
| J18 | E3 | 8.5 | 29.75 | | | 0.8 | 8.5 | 8.5 | 34.0 | | | 0.8 | 8.5 | 76.8 | | | 4,220 |
| J19 | E1 | 8.5 | | | | 1.0 | 8.5 | 8.5 | | 8.5 | | 1.0 | 8.5 | | 14.6 | | 1,796 |
| J20 | E1 | 8.5 | | 8.5 | | 1.0 | 8.5 | 8.5 | | 17.0 | | 1.0 | 8.5 | | 29.2 | | 2,644 |
| J21 | E1 | 8.5 | | 17.0 | | 1.0 | 8.5 | 8.5 | | 25.5 | | 1.0 | 8.5 | | 43.8 | | 3,492 |
| J22 | E1 | 8.5 | | 25.5 | | 1.0 | 8.5 | 8.5 | | 34.0 | | 1.0 | 8.5 | | 48.4 | | 4,340 |
| J23 | E1 | 8.5 | | 34.0 | | 1.0 | 8.5 | 8.5 | | 51.0 | | 1.0 | 8.5 | | 87.6 | | 6,036 |
| J24 | E1 | 8.5 | | 51.0 | | 1.0 | 8.5 | 8.5 | | 68.0 | | 1.0 | 8.5 | | 116.3 | | 7,732 |
| J25 | E2 | 9.5 | | | | 1.0 | 9.5 | 9.5 | | 9.5 | | 1.0 | 9.5 | | 16.05 | | 1,800 |
| J26 | E2 | 9.5 | | 9.5 | | 1.0 | 9.5 | 9.5 | | 19.0 | | 1.0 | 9.5 | | 32.1 | | 2,790 |
| J27 | E2 | 9.5 | | 19.0 | | 1.0 | 9.5 | 9.5 | | 28.5 | | 1.0 | 9.5 | | 48.15 | | 3,720 |
| J28 | E2 | 9.5 | | 28.5 | | 1.0 | 9.5 | 9.5 | | 38.0 | | 1.0 | 9.5 | | 64.2 | | 4,650 |
| J29 | E2 | 9.5 | | 38.0 | | 1.0 | 9.5 | 9.5 | | 57.0 | | 1.0 | 9.5 | | 96.3 | | 6,510 |
| J30 | E2 | 9.5 | | 57.0 | | 1.0 | 9.5 | 9.5 | | 76.0 | | 1.0 | 9.5 | | 128.4 | | 8,370 |
| J31 | E3 | 8.5 | | | | 1.0 | 8.5 | 8.5 | | 8.5 | | 1.0 | 8.5 | | 14.55 | | 1,688 |
| J32 | E3 | 8.5 | | 8.5 | | 1.0 | 8.5 | 8.5 | | 17.0 | | 1.0 | 8.5 | | 29.1 | | 2,532 |
| J33 | E3 | 8.5 | | 17.0 | | 1.0 | 8.5 | 8.5 | | 25.5 | | 1.0 | 8.5 | | 43.65 | | 3,376 |
| J34 | E3 | 8.5 | | 25.5 | | 1.0 | 8.5 | 8.5 | | 34.0 | | 1.0 | 8.5 | | 58.2 | | 4,220 |
| J35 | E3 | 8.5 | | 34.0 | | 1.0 | 8.5 | 8.5 | | 51.0 | | 1.0 | 8.5 | | 87.3 | | 5,908 |
| J36 | E3 | 8.5 | | 51.0 | | 1.0 | 8.5 | 8.5 | | 68.0 | | 1.0 | 8.5 | | 116.4 | | 7,596 |
| J37 | E1 | 8.5 | | | | 0.75 | 8.5 | 8.5 | | | 4.25 | .75 | 8.5 | | | 5.89 | 1,272 |
| J38 | E1 | 8.5 | | | 4.25 | 0.75 | 8.5 | 8.5 | | | 8.5 | .75 | 8.5 | | | 11.78 | 1,696 |
| J39 | E1 | 8.5 | | | 8.5 | 0.75 | 8.5 | 8.5 | | | 12.75 | .75 | 8.5 | | | 17.67 | 2,120 |
| J40 | E1 | 8.5 | | | 12.75 | 0.75 | 8.5 | 8.5 | | | 17.0 | .75 | 8.5 | | | 23.56 | 2,544 |
| J41 | E1 | 8.5 | | | 17.0 | 0.75 | 8.5 | 8.5 | | | 25.5 | .75 | 8.5 | | | 35.34 | 3,392 |
| J42 | E1 | 8.5 | | | 25.5 | 0.75 | 8.5 | 8.5 | | | 34.0 | .75 | 8.5 | | | 47.12 | 4,240 |
| J43 | E2 | 9.5 | | | | 0.75 | 9.5 | 9.5 | | | 4.75 | .75 | 9.5 | | | 6.45 | 1,395 |
| J44 | E2 | 9.5 | | | 4.75 | 0.75 | 9.5 | 9.5 | | | 9.50 | .75 | 9.5 | | | 12.90 | 1,860 |
| J45 | E2 | 9.5 | | | 9.50 | 0.75 | 9.5 | 9.5 | | | 14.25 | .75 | 9.5 | | | 19.35 | 2,325 |
| J46 | E2 | 9.5 | | | 14.25 | 0.75 | 9.5 | 9.5 | | | 19.0 | .75 | 9.5 | | | 25.8 | 2,790 |
| J47 | E2 | 9.5 | | | 19.0 | 0.75 | 9.5 | 9.5 | | | 28.5 | .75 | 9.5 | | | 38.7 | 3,720 |
| J48 | E2 | 9.5 | | | 28.5 | 0.75 | 9.5 | 9.5 | | | 38.0 | .75 | 9.5 | | | 51.6 | 4,650 |
| J49 | E3 | 8.5 | | | | 0.75 | 8.5 | 8.5 | | | 4.25 | .75 | 8.5 | | | 5.86 | 1,266 |
| J50 | E3 | 8.5 | | | 4.25 | 0.75 | 8.5 | 8.5 | | | 8.5 | .75 | 8.5 | | | 11.72 | 1,688 |
| J51 | E3 | 8.5 | | | 8.5 | 0.75 | 8.5 | 8.5 | | | 12.75 | .75 | 8.5 | | | 17.58 | 2,110 |
| J52 | E3 | 8.5 | | | 12.75 | 0.75 | 8.5 | 8.5 | | | 17.0 | .75 | 8.5 | | | 23.44 | 2,532 |
| J53 | E3 | 8.5 | | | 17.0 | 0.75 | 8.5 | 8.5 | | | 25.5 | .75 | 8.5 | | | 35.16 | 3,376 |
| J54 | E3 | 8.5 | | | 25.5 | 0.75 | 8.5 | 8.5 | | | 34.0 | .75 | 8.5 | | | 46.88 | 4,220 |

| | | | Composition before | | | | | Composition at end | | | | | | Molal ratio | | | pSL |
|---|---|---|---|---|---|---|---|---|---|---|---|---|---|---|---|---|---|
| | | | Oxides | | | | | | Oxides | | | | | | | | |
| Ex. No. | OSC, ex. No. | OSC, lbs. | EtO, lbs. | PrO, lbs. | BuO, lbs. | Catalyst, lbs. | Solvent, lbs. | OSC, lbs. | EtO, lbs. | PrO, lbs. | BuO, lbs. | Catalyst, lbs. | Solvent, lbs. | EtO to oxyalkyl. suscept. compd. | PrO to oxyalkyl. suscept. compd. | BuO to oxyalkyl. suscept. compd. | Theo. mol. wt. |
| K1 | J4 | 8.5 | 25.5 | | | 1.0 | 8.5 | 8.5 | 25.5 | 8.5 | | 1.0 | 8.5 | 57.8 | 14.6 | | 4,236 |
| K2 | J4 | 8.5 | 25.5 | 8.5 | | 1.0 | 8.5 | 8.5 | 25.5 | 17.0 | | 1.0 | 8.5 | 57.8 | 29.2 | | 5,084 |
| K3 | J4 | 8.5 | 25.5 | 17.0 | | 1.0 | 8.5 | 8.5 | 25.5 | 25.5 | | 1.0 | 8.5 | 57.8 | 43.8 | | 5,932 |
| K4 | J4 | 8.5 | 25.5 | 25.5 | | 1.0 | 8.5 | 8.5 | 25.5 | 34.0 | | 1.0 | 8.5 | 57.8 | 58.4 | | 6,780 |
| K5 | J4 | 8.5 | 25.5 | 34.0 | | 1.0 | 8.5 | 8.5 | 25.5 | 51.0 | | 1.0 | 8.5 | 57.8 | 87.6 | | 8,476 |
| K6 | J4 | 8.5 | 25.5 | 51.0 | | 1.0 | 8.5 | 8.5 | 25.5 | 68.0 | | 1.0 | 8.5 | 57.8 | 116.8 | | 10,172 |
| K7 | J8 | 9.5 | 19.0 | | | 1.0 | 9.5 | 9.5 | 19.0 | 9.5 | | 1.0 | 9.5 | 42.2 | 16.05 | | 3,720 |
| K8 | J8 | 9.5 | 19.0 | 9.5 | | 1.0 | 9.5 | 9.5 | 19.0 | 19.0 | | 1.0 | 9.5 | 42.2 | 32.1 | | 4,650 |
| K9 | J8 | 9.5 | 19.0 | 19.0 | | 1.0 | 9.5 | 9.5 | 19.0 | 28.5 | | 1.0 | 9.5 | 42.2 | 48.15 | | 5,580 |
| K10 | J8 | 9.5 | 19.0 | 28.5 | | 1.0 | 9.5 | 9.5 | 19.0 | 38.0 | | 1.0 | 9.5 | 42.2 | 64.2 | | 6,510 |
| K11 | J8 | 9.5 | 19.0 | 38.0 | | 1.0 | 9.5 | 9.5 | 19.0 | 57.0 | | 1.0 | 9.5 | 42.2 | 96.3 | | 8,370 |
| K12 | J8 | 9.5 | 19.0 | 57.0 | | 1.0 | 9.5 | 9.5 | 19.0 | 76.0 | | 1.0 | 9.5 | 42.2 | 128.4 | | 10,230 |
| K13 | J15 | 8.5 | 21.25 | | | 1.0 | 8.5 | 8.5 | 21.25 | 8.5 | | 1.0 | 8.5 | 48.0 | 14.55 | | 3,798 |
| K14 | J15 | 8.5 | 21.25 | 8.5 | | 1.0 | 8.5 | 8.5 | 21.25 | 17.0 | | 1.0 | 8.5 | 48.0 | 29.1 | | 4,642 |
| K15 | J15 | 8.5 | 21.25 | 17.0 | | 1.0 | 8.5 | 8.5 | 21.25 | 25.5 | | 1.0 | 8.5 | 48.0 | 43.65 | | 5,486 |
| K16 | J15 | 8.5 | 21.25 | 25.5 | | 1.0 | 8.5 | 8.5 | 21.25 | 34.0 | | 1.0 | 8.5 | 48.0 | 58.2 | | 6,330 |
| K17 | J15 | 8.5 | 21.25 | 34.0 | | 1.0 | 8.5 | 8.5 | 21.25 | 51.0 | | 1.0 | 8.5 | 48.0 | 87.3 | | 8,018 |
| K18 | J15 | 8.5 | 21.25 | 51.0 | | 1.0 | 8.5 | 8.5 | 21.25 | 68.0 | | 1.0 | 8.5 | 48.0 | 116.4 | | 9,706 |
| K19 | J24 | 8.5 | | 68.0 | | 1.0 | 8.5 | 8.5 | 4.25 | 68.0 | | 1.0 | 8.5 | 9.62 | 116.8 | | 8,156 |
| K20 | J24 | 8.5 | 4.25 | 68.0 | | 1.0 | 8.5 | 8.5 | 8.50 | 68.0 | | 1.0 | 8.5 | 19.25 | 116.8 | | 8,580 |
| K21 | J24 | 8.5 | 8.50 | 68.0 | | 1.0 | 8.5 | 8.5 | 12.75 | 68.0 | | 1.0 | 8.5 | 28.87 | 116.8 | | 9,004 |
| K22 | J24 | 8.5 | 12.75 | 68.0 | | 1.0 | 8.5 | 8.5 | 17.0 | 68.0 | | 1.0 | 8.5 | 38.5 | 116.8 | | 9,428 |
| K23 | J24 | 8.5 | 17.0 | 68.0 | | 1.0 | 8.5 | 8.5 | 21.25 | 68.0 | | 1.0 | 8.5 | 48.12 | 116.8 | | 9,852 |
| K24 | J24 | 8.5 | 21.25 | 68.0 | | 1.0 | 8.5 | 8.5 | 25.5 | 68.0 | | 1.0 | 8.5 | 57.75 | 116.8 | | 10,276 |
| K25 | J30 | 9.5 | | 76.0 | | 1.0 | 9.5 | 9.5 | 4.75 | 76.0 | | 1.0 | 9.5 | 10.55 | 128.4 | | 8,835 |
| K26 | J30 | 9.5 | 4.75 | 76.0 | | 1.0 | 9.5 | 9.5 | 9.5 | 76.0 | | 1.0 | 9.5 | 21.1 | 128.4 | | 9,300 |
| K27 | J30 | 9.5 | 9.50 | 76.0 | | 1.0 | 9.5 | 9.5 | 14.0 | 76.0 | | 1.0 | 9.5 | 31.65 | 128.4 | | 9,765 |
| K28 | J30 | 9.5 | 14.0 | 76.0 | | 1.0 | 9.5 | 9.5 | 19.0 | 76.0 | | 1.0 | 9.5 | 42.2 | 128.4 | | 10,230 |
| K29 | J30 | 9.5 | 19.0 | 76.0 | | 1.0 | 9.5 | 9.5 | 23.75 | 76.0 | | 1.0 | 9.5 | 52.75 | 128.4 | | 10,695 |
| K30 | J30 | 9.5 | 23.75 | 76.0 | | 1.0 | 9.5 | 9.5 | 28.0 | 76.0 | | 1.0 | 9.5 | 63.3 | 128.4 | | 11,160 |
| K31 | J35 | 8.5 | | 51.0 | | 1.0 | 8.5 | 8.5 | 4.25 | 51.0 | | 1.0 | 8.5 | 9.6 | 87.3 | | 6,330 |
| K32 | J35 | 8.5 | 4.25 | 51.0 | | 1.0 | 8.5 | 8.5 | 8.50 | 51.0 | | 1.0 | 8.5 | 19.2 | 87.3 | | 6,752 |
| K33 | J35 | 8.5 | 8.50 | 51.0 | | 1.0 | 8.5 | 8.5 | 12.75 | 51.0 | | 1.0 | 8.5 | 28.8 | 87.3 | | 7,174 |
| K34 | J35 | 8.5 | 12.75 | 51.0 | | 1.0 | 8.5 | 8.5 | 17.0 | 51.0 | | 1.0 | 8.5 | 38.4 | 87.3 | | 7,596 |
| K35 | J35 | 8.5 | 17.0 | 51.0 | | 1.0 | 8.5 | 8.5 | 21.25 | 51.0 | | 1.0 | 8.5 | 48.0 | 87.3 | | 8,018 |
| K36 | J35 | 8.5 | 21.25 | 51.0 | | 1.0 | 8.5 | 8.5 | 25.5 | 51.0 | | 1.0 | 8.5 | 57.6 | 87.3 | | 8,440 |
| K37 | J1 | 8.5 | 8.5 | | 8.5 | 1.0 | 8.5 | 8.5 | 8.5 | | 8.5 | 1.0 | 8.5 | 19.25 | | 11.78 | 2,544 |
| K38 | J1 | 8.5 | 8.5 | | 12.75 | 1.0 | 8.5 | 8.5 | 8.5 | | 12.75 | 1.0 | 8.5 | 19.25 | | 17.67 | 2,968 |
| K39 | J1 | 8.5 | 8.5 | | 12.75 | 1.0 | 8.5 | 8.5 | 8.5 | | 17.0 | 1.0 | 8.5 | 19.25 | | 23.56 | 3,392 |
| K40 | J1 | 8.5 | 8.5 | | 17.0 | 1.0 | 8.5 | 8.5 | 8.5 | | 25.5 | 1.0 | 8.5 | 19.25 | | 35.34 | 4,240 |
| K41 | J1 | 8.5 | 8.5 | | 25.5 | 1.0 | 8.5 | 8.5 | 8.5 | | 34.0 | 1.0 | 8.5 | 19.25 | | 47.12 | 5,088 |
| K42 | J1 | 8.5 | 8.5 | | 34.0 | 1.0 | 8.5 | 8.5 | 8.5 | | 38.25 | 1.0 | 8.5 | 19.25 | | 53.01 | 5,512 |
| K43 | J8 | 9.5 | 19.0 | | | 1.0 | 9.5 | 9.5 | 19.0 | | 9.5 | 1.0 | 9.5 | 42.2 | | 12.9 | 3,720 |
| K44 | J8 | 9.5 | 19.0 | | 9.5 | 1.0 | 9.5 | 9.5 | 19.0 | | 14.25 | 1.0 | 9.5 | 42.2 | | 19.35 | 4,185 |
| K45 | J8 | 9.5 | 19.0 | | 14.25 | 1.0 | 9.5 | 9.5 | 19.0 | | 19.0 | 1.0 | 9.5 | 42.2 | | 25.8 | 4,650 |
| K46 | J8 | 9.5 | 19.0 | | 19.0 | 1.0 | 9.5 | 9.5 | 19.0 | | 23.75 | 1.0 | 9.5 | 42.2 | | 32.25 | 5,115 |
| K47 | J8 | 9.5 | 19.0 | | 23.75 | 1.0 | 9.5 | 9.5 | 19.0 | | 28.5 | 1.0 | 9.5 | 42.2 | | 38.7 | 5,580 |
| K48 | J8 | 9.5 | 19.0 | | 28.5 | 1.0 | 9.5 | 9.5 | 19.0 | | 38.0 | 1.0 | 9.5 | 42.2 | | 51.6 | 6,510 |
| K49 | J15 | 8.5 | 21.25 | | | 1.0 | 8.5 | 8.5 | 21.25 | | 8.5 | 1.0 | 8.5 | 48.0 | | 11.72 | 3,798 |
| K50 | J15 | 8.5 | 21.25 | | 8.5 | 1.0 | 8.5 | 8.5 | 21.25 | | 12.75 | 1.0 | 8.5 | 48.0 | | 17.58 | 4,220 |
| K51 | J15 | 8.5 | 21.25 | | 12.75 | 1.0 | 8.5 | 8.5 | 21.25 | | 17.0 | 1.0 | 8.5 | 48.0 | | 23.44 | 4,642 |
| K52 | J15 | 8.5 | 21.25 | | 17.0 | 1.0 | 8.5 | 8.5 | 21.25 | | 25.5 | 1.0 | 8.5 | 48.0 | | 35.16 | 5,486 |
| K53 | J15 | 8.5 | 21.25 | | 25.5 | 1.0 | 8.5 | 8.5 | 21.25 | | 34.0 | 1.0 | 8.5 | 48.0 | | 46.88 | 6,330 |
| K54 | J15 | 8.5 | 21.25 | | 34.0 | 1.0 | 8.5 | 8.5 | 21.25 | | 51.0 | 1.0 | 8.5 | 48.0 | | 70.32 | 8,018 |
| K55 | J41 | 8.5 | | | 25.5 | 1.0 | 8.5 | 8.5 | 8.5 | | 25.5 | 1.0 | 8.5 | 19.25 | | 35.34 | 4,240 |
| K56 | J41 | 8.5 | 8.5 | | 25.5 | 1.0 | 8.5 | 8.5 | 17.0 | | 25.5 | 1.0 | 8.5 | 38.50 | | 35.34 | 5,088 |
| K57 | J41 | 8.5 | 17.0 | | 25.5 | 1.0 | 8.5 | 8.5 | 25.5 | | 25.5 | 1.0 | 8.5 | 57.8 | | 35.34 | 5,936 |
| K58 | J41 | 8.5 | 25.5 | | 25.5 | 1.0 | 8.5 | 8.5 | 34.0 | | 25.5 | 1.0 | 8.5 | 77.1 | | 35.34 | 6,784 |
| K59 | J41 | 8.5 | 34.0 | | 25.5 | 1.0 | 8.5 | 8.5 | 43.5 | | 25.5 | 1.0 | 8.5 | 96.35 | | 35.34 | 7,632 |
| K60 | J41 | 8.5 | 43.5 | | 25.5 | 1.0 | 8.5 | 8.5 | 51.0 | | 25.5 | 1.0 | 8.5 | 115.6 | | 35.34 | 8,480 |
| K61 | J48 | 9.5 | | | 38.0 | 1.0 | 9.5 | 9.5 | 4.75 | | 38.0 | 1.0 | 9.5 | 10.55 | | 51.6 | 5,115 |
| K62 | J48 | 9.5 | 4.75 | | 38.0 | 1.0 | 9.5 | 9.5 | 9.5 | | 38.0 | 1.0 | 9.5 | 21.1 | | 51.6 | 5,580 |
| K63 | J48 | 9.5 | 9.5 | | 38.0 | 1.0 | 9.5 | 9.5 | 14.25 | | 38.0 | 1.0 | 9.5 | 31.65 | | 51.6 | 6,045 |
| K64 | J48 | 9.5 | 14.25 | | 38.0 | 1.0 | 9.5 | 9.5 | 19.0 | | 38.0 | 1.0 | 9.5 | 42.2 | | 51.6 | 6,510 |
| K65 | J48 | 9.5 | 19.0 | | 38.0 | 1.0 | 9.5 | 9.5 | 28.5 | | 38.0 | 1.0 | 9.5 | 63.3 | | 51.6 | 7,440 |
| K66 | J48 | 9.5 | 28.5 | | 38.0 | 1.0 | 9.5 | 9.5 | 38.0 | | 38.0 | 1.0 | 9.5 | 84.4 | | 51.6 | 8,370 |
| K67 | J54 | 8.5 | | | 34.0 | 1.0 | 8.5 | 8.5 | 4.25 | | 34.0 | 1.0 | 8.5 | 9.6 | | 46.88 | 4,642 |
| K68 | J54 | 8.5 | 4.25 | | 34.0 | 1.0 | 8.5 | 8.5 | 8.50 | | 34.0 | 1.0 | 8.5 | 19.2 | | 46.88 | 5,064 |
| K69 | J54 | 8.5 | 8.5 | | 34.0 | 1.0 | 8.5 | 8.5 | 12.75 | | 34.0 | 1.0 | 8.5 | 28.8 | | 46.88 | 5,486 |
| K70 | J54 | 8.5 | 12.75 | | 34.0 | 1.0 | 8.5 | 8.5 | 17.0 | | 34.0 | 1.0 | 8.5 | 38.4 | | 46.88 | 5,908 |
| K71 | J54 | 8.5 | 17.0 | | 34.0 | 1.0 | 8.5 | 8.5 | 25.5 | | 34.0 | 1.0 | 8.5 | 57.6 | | 46.88 | 6,752 |
| K72 | J54 | 8.5 | 25.5 | | 34.0 | 1.0 | 8.5 | 8.5 | 34.0 | | 34.0 | 1.0 | 8.5 | 76.8 | | 46.88 | 7,596 |
| K73 | J42 | 8.5 | | | 34.0 | 1.25 | 8.5 | 8.5 | | 8.5 | 34.0 | 1.25 | 8.5 | | 14.6 | 47.12 | 5,088 |
| K74 | J42 | 8.5 | | 8.5 | 34.0 | 1.25 | 8.5 | 8.5 | | 17.0 | 34.0 | 1.25 | 8.5 | | 29.2 | 47.12 | 5,936 |
| K75 | J42 | 8.5 | | 17.0 | 34.0 | 1.25 | 8.5 | 8.5 | | 25.5 | 34.0 | 1.25 | 8.5 | | 43.8 | 47.12 | 6,784 |
| K76 | J42 | 8.5 | | 25.5 | 34.0 | 1.25 | 8.5 | 8.5 | | 34.0 | 34.0 | 1.25 | 8.5 | | 58.4 | 47.12 | 7,632 |
| K77 | J42 | 8.5 | | 34.0 | 34.0 | 1.25 | 8.5 | 8.5 | | 51.0 | 34.0 | 1.25 | 8.5 | | 87.6 | 47.12 | 9,328 |
| K78 | J42 | 8.5 | | 51.0 | 34.0 | 1.25 | 8.5 | 8.5 | | 68.0 | 34.0 | 1.25 | 8.5 | | 116.8 | 47.12 | 11,024 |
| K79 | J47 | 9.5 | | | 28.5 | 1.25 | 9.5 | 9.5 | | 9.5 | 28.5 | 1.25 | 9.5 | | 16.05 | 38.7 | 4,650 |
| K80 | J47 | 9.5 | | 9.5 | 28.5 | 1.25 | 9.5 | 9.5 | | 19.0 | 28.5 | 1.25 | 9.5 | | 32.1 | 38.7 | 5,580 |
| K81 | J47 | 9.5 | | 19.0 | 28.5 | 1.25 | 9.5 | 9.5 | | 28.5 | 28.5 | 1.25 | 9.5 | | 48.15 | 38.7 | 6,510 |
| K82 | J47 | 9.5 | | 28.5 | 28.5 | 1.25 | 9.5 | 9.5 | | 38.0 | 28.5 | 1.25 | 9.5 | | 64.2 | 38.7 | 7,440 |
| K83 | J47 | 9.5 | | 38.0 | 28.5 | 1.25 | 9.5 | 9.5 | | 57.0 | 28.5 | 1.25 | 9.5 | | 96.3 | 38.7 | 9,300 |
| K84 | J47 | 9.5 | | 57.0 | 28.5 | 1.25 | 9.5 | 9.5 | | 76.0 | 28.5 | 1.25 | 9.5 | | 128.4 | 38.7 | 11,160 |
| K85 | J53 | 8.5 | | 57.0 | 25.5 | 1.25 | 8.5 | 8.5 | | 17.0 | 25.5 | 1.25 | 8.5 | | 29.1 | 35.16 | 5,064 |
| K86 | J53 | 8.5 | | 17.0 | 25.5 | 1.25 | 8.5 | 8.5 | | 25.5 | 25.5 | 1.25 | 8.5 | | 43.65 | 35.16 | 5,908 |
| K87 | J53 | 8.5 | | 25.5 | 25.5 | 1.25 | 8.5 | 8.5 | | 34.0 | 25.5 | 1.25 | 8.5 | | 58.2 | 35.16 | 6,752 |
| K88 | J53 | 8.5 | | 34.0 | 25.5 | 1.25 | 8.5 | 8.5 | | 51.0 | 25.5 | 1.25 | 8.5 | | 87.3 | 35.16 | 8,440 |
| K89 | J53 | 8.5 | | 51.0 | 25.5 | 1.25 | 8.5 | 8.5 | | 68.0 | 25.5 | 1.25 | 8.5 | | 116.4 | 35.16 | 10,128 |
| K90 | J53 | 8.5 | | 68.0 | 25.5 | 1.25 | 8.5 | 8.5 | | 85.0 | 25.5 | 1.25 | 8.5 | | 145.5 | 35.16 | 11,816 |

TABLE X

| Ex. No. | OSC, ex. No. | OSC, lbs. | Oxides (Composition before) | | | Catalyst, lbs. | Solvent, lbs. | OSC, lbs. | Oxides (Composition at end) | | | Catalyst, lbs. | Solvent, lbs. | Molal ratio | | | Theo. mol. wt. |
|---|---|---|---|---|---|---|---|---|---|---|---|---|---|---|---|---|---|
| | | | EtO, lbs. | PrO, lbs. | BuO, lbs. | | | | EtO, lbs. | PrO, lbs. | BuO, lbs. | | | EtO to oxyalkyl. suscept. compd. | PrO to oxyalkyl. suscept. compd. | BuO to oxyalkyl. suscept. compd. | |
| L1 | K78 | 8.5 | -------- | 68.0 | 34.0 | 1.25 | 8.5 | 8.5 | 4.25 | 68.0 | 34.0 | 1.25 | 8.5 | 9.62 | 116.8 | 47.12 | 11,448 |
| L2 | K78 | 8.5 | 4.25 | 68.0 | 34.0 | 1.25 | 8.5 | 8.5 | 8.50 | 68.0 | 34.0 | 1.25 | 8.5 | 19.25 | 116.8 | 47.12 | 11,872 |
| L3 | K78 | 8.5 | 8.5 | 68.0 | 34.0 | 1.25 | 8.5 | 8.5 | 12.75 | 68.0 | 34.0 | 1.25 | 8.5 | 28.87 | 116.8 | 47.12 | 12,296 |
| L4 | K78 | 8.5 | 12.75 | 68.0 | 34.0 | 1.25 | 8.5 | 8.5 | 17.0 | 68.0 | 34.0 | 1.25 | 8.5 | 38.5 | 116.8 | 47.12 | 12,720 |
| L5 | K78 | 8.5 | 17.0 | 68.0 | 34.0 | 1.25 | 8.5 | 8.5 | 21.25 | 68.0 | 34.0 | 1.25 | 8.5 | 48.2 | 116.8 | 47.12 | 13,144 |
| L6 | K78 | 8.5 | 21.25 | 68.0 | 34.0 | 1.25 | 8.5 | 8.5 | 25.5 | 68.0 | 34.0 | 1.25 | 8.5 | 57.8 | 116.8 | 47.12 | 13,568 |
| L7 | K84 | 9.5 | -------- | 76.0 | 28.5 | 1.25 | 9.5 | 9.5 | 4.75 | 76.0 | 28.5 | 1.25 | 9.5 | 10.55 | 128.4 | 38.7 | 11,625 |
| L8 | K84 | 9.5 | 4.75 | 76.0 | 28.5 | 1.25 | 9.5 | 9.5 | 9.50 | 76.0 | 28.5 | 1.25 | 9.5 | 21.1 | 128.4 | 38.7 | 12,090 |
| L9 | K84 | 9.5 | 9.5 | 76.0 | 28.5 | 1.25 | 9.5 | 9.5 | 14.25 | 76.0 | 28.5 | 1.25 | 9.5 | 31.65 | 128.4 | 38.7 | 12,555 |
| L10 | K84 | 9.5 | 14.25 | 76.0 | 28.5 | 1.25 | 9.5 | 9.5 | 19.0 | 76.0 | 28.5 | 1.25 | 9.5 | 42.2 | 128.4 | 38.7 | 13,020 |
| L11 | K84 | 9.5 | 19.0 | 76.0 | 28.5 | 1.25 | 9.5 | 9.5 | 23.75 | 76.0 | 28.5 | 1.25 | 9.5 | 52.75 | 128.4 | 38.7 | 13,485 |
| L12 | K84 | 9.5 | 23.75 | 76.0 | 28.5 | 1.25 | 9.5 | 9.5 | 28.50 | 76.0 | 28.5 | 1.25 | 9.5 | 63.3 | 128.4 | 38.7 | 13,950 |
| L13 | K90 | 8.5 | -------- | 85.0 | 25.5 | 1.25 | 8.5 | 8.5 | 4.25 | 85.0 | 25.5 | 1.25 | 8.5 | 9.6 | 145.5 | 35.16 | 12,238 |
| L14 | K90 | 8.5 | 4.25 | 85.0 | 25.5 | 1.25 | 8.5 | 8.5 | 8.5 | 85.0 | 25.5 | 1.25 | 8.5 | 19.2 | 145.5 | 35.16 | 12,680 |
| L15 | K90 | 8.5 | 8.5 | 85.0 | 25.5 | 1.25 | 8.5 | 8.5 | 12.75 | 85.0 | 25.5 | 1.25 | 8.5 | 28.8 | 145.5 | 35.16 | 13,082 |
| L16 | K90 | 8.5 | 12.75 | 85.0 | 25.5 | 1.25 | 8.5 | 8.5 | 17.0 | 85.0 | 25.5 | 1.25 | 8.5 | 38.4 | 145.5 | 35.16 | 13,504 |
| L17 | K90 | 8.5 | 17.0 | 85.0 | 25.5 | 1.25 | 8.5 | 8.5 | 25.5 | 85.0 | 25.5 | 1.25 | 8.5 | 57.6 | 145.5 | 35.16 | 14,348 |
| L18 | K90 | 8.5 | 25.5 | 85.0 | 25.5 | 1.25 | 8.5 | 8.5 | 34.0 | 85.0 | 25.5 | 1.25 | 8.5 | 76.8 | 145.5 | 35.16 | 15,192 |
| L19 | K57 | 8.5 | 25.5 | -------- | 25.5 | 1.25 | 8.5 | 8.5 | 25.5 | 8.5 | 25.5 | 1.25 | 8.5 | 57.8 | 14.6 | 35.34 | 6,784 |
| L20 | K57 | 8.5 | 25.5 | 8.5 | 25.5 | 1.25 | 8.5 | 8.5 | 25.5 | 17.0 | 25.5 | 1.25 | 8.5 | 57.8 | 29.2 | 35.34 | 7,632 |
| L21 | K57 | 8.5 | 25.5 | 17.0 | 25.5 | 1.25 | 8.5 | 8.5 | 25.5 | 25.5 | 25.5 | 1.25 | 8.5 | 57.8 | 43.8 | 35.34 | 8,480 |
| L22 | K57 | 8.5 | 25.5 | 25.5 | 25.5 | 1.25 | 8.5 | 8.5 | 25.5 | 34.0 | 25.5 | 1.25 | 8.5 | 57.8 | 58.4 | 35.34 | 9,323 |
| L23 | K57 | 8.5 | 25.5 | 34.0 | 25.5 | 1.25 | 8.5 | 8.5 | 25.5 | 42.5 | 25.5 | 1.25 | 8.5 | 57.8 | 73.0 | 35.34 | 10,176 |
| L24 | K57 | 8.5 | 25.5 | 42.5 | 25.5 | 1.25 | 8.5 | 8.5 | 25.5 | 51.0 | 25.5 | 1.25 | 8.5 | 57.8 | 87.6 | 35.34 | 11,024 |
| L25 | K64 | 9.5 | 19.0 | -------- | 38.0 | 1.25 | 9.5 | 9.5 | 19.0 | 9.5 | 38.0 | 1.25 | 9.5 | 42.2 | 16.05 | 51.6 | 7,440 |
| L26 | K64 | 9.5 | 19.0 | 9.5 | 38.0 | 1.25 | 9.5 | 9.5 | 19.0 | 19.0 | 38.0 | 1.25 | 9.5 | 42.2 | 48.15 | 51.6 | 9,200 |
| L27 | K64 | 9.5 | 19.0 | 19.0 | 38.0 | 1.25 | 9.5 | 9.5 | 19.0 | 28.5 | 38.0 | 1.25 | 9.5 | 42.2 | 48.15 | 51.6 | 9,200 |
| L28 | K64 | 9.5 | 19.0 | 28.5 | 38.0 | 1.25 | 9.5 | 9.5 | 19.0 | 38.0 | 38.0 | 1.25 | 9.5 | 42.2 | 64.2 | 51.6 | 10,130 |
| L29 | K64 | 9.5 | 19.0 | 38.0 | 38.0 | 1.25 | 9.5 | 9.5 | 19.0 | 47.5 | 38.0 | 1.25 | 9.5 | 42.2 | 80.25 | 51.6 | 11,060 |
| L30 | K64 | 9.5 | 19.0 | 47.5 | 38.0 | 1.25 | 9.5 | 9.5 | 19.0 | 57.0 | 38.0 | 1.25 | 9.5 | 42.2 | 96.3 | 51.6 | 11,990 |
| L31 | K72 | 8.5 | 34.0 | -------- | 34.0 | 1.25 | 8.5 | 8.5 | 34.0 | 8.5 | 34.0 | 1.25 | 8.5 | 76.8 | 14.55 | 46.88 | 8,440 |
| L32 | K72 | 8.5 | 34.0 | 8.5 | 34.0 | 1.25 | 8.5 | 8.5 | 34.0 | 17.0 | 34.0 | 1.25 | 8.5 | 76.8 | 29.1 | 46.88 | 9,284 |
| L33 | K72 | 8.5 | 34.0 | 17.0 | 34.0 | 1.25 | 8.5 | 8.5 | 34.0 | 25.5 | 34.0 | 1.25 | 8.5 | 76.8 | 43.65 | 46.88 | 10,128 |
| L34 | K72 | 8.5 | 34.0 | 25.5 | 34.0 | 1.25 | 8.5 | 8.5 | 34.0 | 34.0 | 34.0 | 1.25 | 8.5 | 76.8 | 58.2 | 46.88 | 10,972 |
| L35 | K72 | 8.5 | 34.0 | 34.0 | 34.0 | 1.25 | 8.5 | 8.5 | 34.0 | 42.5 | 34.0 | 1.25 | 8.5 | 76.8 | 72.75 | 46.88 | 11,816 |
| L36 | K72 | 8.5 | 34.0 | 42.5 | 34.0 | 1.25 | 8.5 | 8.5 | 34.0 | 51.0 | 34.0 | 1.25 | 8.5 | 76.8 | 87.3 | 46.88 | 12,650 |

TABLE XI

| Ex. No. | Max. temp., °C. | Max. pres., p.s.i. | Time, hrs. | Solubility | | |
|---|---|---|---|---|---|---|
| | | | | Water | Xylene | Kerosene |
| J1 | 125–130 | 10–15 | 1 | Emulsifiable | Soluble | Insoluble. |
| J2 | 125–130 | 10–15 | 1½ | Soluble | Insoluble | Do. |
| J3 | 125–130 | 10–15 | ¾ | ----do---- | ----do---- | Do. |
| J4 | 125–130 | 10–15 | 1 | ----do---- | ----do---- | Do. |
| J5 | 125–130 | 10–15 | 1 | ----do---- | ----do---- | Do. |
| J6 | 125–130 | 10–15 | 1½ | ----do---- | ----do---- | Do. |
| J7 | 125–130 | 10–15 | 1 | Emulsifiable | ----do---- | Do. |
| J8 | 125–130 | 10–15 | 1¾ | Soluble | ----do---- | Do. |
| J9 | 125–130 | 10–15 | ¾ | ----do---- | ----do---- | Do. |
| J10 | 125–130 | 10–15 | 1 | ----do---- | ----do---- | Do. |
| J11 | 125–130 | 10–15 | 1¼ | ----do---- | ----do---- | Do. |
| J12 | 125–130 | 10–15 | 1¾ | ----do---- | ----do---- | Do. |
| J13 | 125–130 | 10–15 | 1¾ | Emulsifiable | ----do---- | Do. |
| J14 | 125–130 | 10–15 | 1½ | Soluble | ----do---- | Do. |
| J15 | 125–130 | 10–15 | ¾ | ----do---- | ----do---- | Do. |
| J16 | 125–130 | 10–15 | 1 | ----do---- | ----do---- | Do. |
| J17 | 125–130 | 10–15 | 1 | ----do---- | ----do---- | Do. |
| J18 | 125–130 | 10–15 | 1½ | ----do---- | ----do---- | Do. |
| J19 | 125–130 | 10–15 | 1 | Insoluble | Soluble | Do. |
| J20 | 125–130 | 10–15 | 1½ | ----do---- | ----do---- | Do. |
| J21 | 125–130 | 10–15 | ¾ | ----do---- | ----do---- | Do. |
| J22 | 125–130 | 10–15 | 1 | ----do---- | ----do---- | Do. |
| J23 | 125–130 | 10–15 | 3½ | ----do---- | ----do---- | Do. |
| J24 | 125–130 | 10–15 | 4 | ----do---- | ----do---- | Soluble. |
| J25 | 125–130 | 10–15 | 1½ | ----do---- | ----do---- | Insoluble. |
| J26 | 125–130 | 10–15 | 2 | ----do---- | ----do---- | Do. |
| J27 | 125–130 | 10–15 | 2 | ----do---- | ----do---- | Do. |
| J28 | 125–130 | 10–15 | 2½ | ----do---- | ----do---- | Do. |
| J29 | 125–130 | 10–15 | 5 | ----do---- | ----do---- | Soluble. |
| J30 | 125–130 | 10–15 | 6 | ----do---- | ----do---- | Do. |
| J31 | 125–130 | 10–15 | 1¾ | ----do---- | ----do---- | Insoluble. |
| J32 | 125–130 | 10–15 | 1½ | ----do---- | ----do---- | Do. |
| J33 | 125–130 | 10–15 | 2 | ----do---- | ----do---- | Do. |
| J34 | 125–130 | 10–15 | 2 | ----do---- | ----do---- | Do. |
| J35 | 125–130 | 10–15 | 4 | ----do---- | ----do---- | Soluble. |
| J36 | 125–130 | 10–15 | 5 | ----do---- | ----do---- | Insoluble. |
| J37 | 145–150 | 20–30 | 1 | ----do---- | ----do---- | Do. |
| J38 | 145–150 | 20–30 | 1 | ----do---- | ----do---- | Do. |
| J39 | 145–150 | 20–30 | 1¼ | ----do---- | ----do---- | Do. |
| J40 | 145–150 | 20–30 | 1½ | ----do---- | ----do---- | Soluble. |
| J41 | 145–150 | 20–30 | 3¼ | ----do---- | ----do---- | Do. |
| J42 | 145–150 | 20–30 | 4½ | ----do---- | ----do---- | Do. |
| J43 | 145–150 | 20–30 | 1¼ | ----do---- | ----do---- | Insoluble. |
| J44 | 145–150 | 20–30 | 1½ | ----do---- | ----do---- | Do. |
| J45 | 145–150 | 20–30 | 2 | ----do---- | ----do---- | Do. |
| J46 | 145–150 | 20–30 | 2½ | ----do---- | ----do---- | Soluble. |
| J47 | 145–150 | 20–30 | 5 | ----do---- | ----do---- | Do. |
| J48 | 145–150 | 20–30 | 6 | ----do---- | ----do---- | Do. |
| J49 | 145–150 | 20–30 | 1½ | ----do---- | ----do---- | Do. |
| J50 | 145–150 | 20–30 | 1½ | ----do---- | ----do---- | Do. |
| J51 | 145–150 | 20–30 | 2 | ----do---- | ----do---- | Do. |
| J52 | 145–150 | 20–30 | 2½ | ----do---- | ----do---- | Do. |
| J53 | 145–150 | 20–30 | 5 | ----do---- | ----do---- | Do. |
| J54 | 145–150 | 20–30 | 6½ | ----do---- | ----do---- | Do. |

TABLE XII

| Ex. No. | Max. temp., °C. | Max. pres., p.s.i. | Time, hrs. | Solubility Water | Solubility Xylene | Solubility Kerosene |
|---|---|---|---|---|---|---|
| K1 | 125-130 | 10-15 | 5½ | Emulsifiable | Soluble | Insoluble. |
| K2 | 125-130 | 10-15 | 1½ | Insoluble | do | Do. |
| K3 | 125-130 | 10-15 | 1¾ | do | do | Do. |
| K4 | 125-130 | 10-15 | 2 | do | do | Do. |
| K5 | 125-130 | 10-15 | 4¾ | do | do | Do. |
| K6 | 125-130 | 10-15 | 6½ | do | do | Do. |
| K7 | 125-130 | 10-15 | 5¾ | do | do | Do. |
| K8 | 125-130 | 10-15 | 2 | do | do | Do. |
| K9 | 125-130 | 10-15 | 2 | do | do | Do. |
| K10 | 125-130 | 10-15 | 3 | do | do | Do. |
| K11 | 125-130 | 10-15 | 6 | do | do | Do. |
| K12 | 125-130 | 10-15 | 6½ | do | do | Do. |
| K13 | 125-130 | 10-15 | 6½ | do | do | Do. |
| K14 | 125-130 | 10-15 | 2 | do | do | Do. |
| K15 | 125-130 | 10-15 | 3 | do | do | Do. |
| K16 | 125-130 | 10-15 | 3 | do | do | Do. |
| K17 | 125-130 | 10-15 | 6 | do | do | Do. |
| K18 | 125-130 | 10-15 | 6¼ | do | do | Do. |
| K19 | 125-130 | 10-15 | 12 | do | do | Do. |
| K20 | 125-130 | 10-15 | ¾ | Emulsifiable | do | Do. |
| K21 | 125-130 | 10-15 | ¾ | do | do | Do. |
| K22 | 125-130 | 10-15 | 1 | do | do | Do. |
| K23 | 125-130 | 10-15 | 1½ | do | do | Do. |
| K24 | 125-130 | 10-15 | 2 | do | do | Do. |
| K25 | 125-130 | 10-15 | 20 | Insoluble | do | Do. |
| K26 | 125-130 | 10-15 | ¾ | Emulsifiable | do | Do. |
| K27 | 125-130 | 10-15 | 1 | do | do | Do. |
| K28 | 125-130 | 10-15 | 1¼ | do | do | Do. |
| K29 | 125-130 | 10-15 | 1½ | do | do | Do. |
| K30 | 125-130 | 10-15 | 2 | do | do | Do. |
| K31 | 125-130 | 10-15 | 11½ | Insoluble | do | Do. |
| K32 | 125-130 | 10-15 | ½ | Emulsifiable | do | Do. |
| K33 | 125-130 | 10-15 | ¾ | do | do | Do. |
| K34 | 125-130 | 10-15 | 1 | do | do | Do. |
| K35 | 125-130 | 10-15 | 1½ | do | do | Do. |
| K36 | 125-130 | 10-15 | 1¾ | do | do | Do. |
| K37 | 125-145 | 10-15 | 2¾ | do | do | Do. |
| K38 | 145-150 | 10-15 | 1 | Insoluble | do | Do. |
| K39 | 145-150 | 10-15 | 1¼ | do | do | Do. |
| K40 | 145-150 | 10-15 | 3 | do | do | Do. |
| K41 | 145-150 | 10-15 | 3½ | do | do | Do. |
| K42 | 145-150 | 10-15 | 2½ | do | do | Do. |
| K43 | 125-145 | 10-15 | 5 | Emulsifiable | do | Do. |
| K44 | 145-150 | 10-15 | 1½ | do | do | Do. |
| K45 | 145-150 | 10-15 | 1¾ | do | do | Do. |
| K46 | 145-150 | 10-15 | 2 | do | do | Do. |
| K47 | 145-150 | 10-15 | 2½ | Insoluble | do | Do. |
| K48 | 145-150 | 10-15 | 5 | do | do | Do. |
| K49 | 125-145 | 10-15 | 6 | Emulsifiable | do | Do. |
| K50 | 145-150 | 10-15 | 1½ | do | do | Do. |
| K51 | 145-150 | 10-15 | 1¾ | do | do | Do. |
| K52 | 145-150 | 10-15 | 3½ | do | do | Do. |
| K53 | 145-150 | 10-15 | 4 | do | do | Do. |
| K54 | 145-150 | 10-15 | 8 | Insoluble | do | Do. |
| K55 | 150-125 | 10-15 | 9 | Emulsifiable | do | Do. |
| K56 | 125-130 | 10-15 | 1 | do | do | Do. |
| K57 | 125-130 | 10-15 | 1½ | do | do | Do. |
| K58 | 125-130 | 10-15 | 1¾ | do | do | Do. |
| K59 | 125-130 | 10-15 | 2 | do | do | Do. |
| K60 | 125-130 | 10-15 | 2½ | do | do | Do. |
| K61 | 150-125 | 10-15 | 19 | Insoluble | do | Do. |
| K62 | 125-130 | 10-15 | ¾ | do | do | Do. |
| K63 | 125-130 | 10-15 | 1 | Emulsifiable | do | Do. |
| K64 | 125-130 | 10-15 | 1½ | do | do | Do. |
| K65 | 125-130 | 10-15 | 3 | do | do | Do. |
| K66 | 125-130 | 10-15 | 3½ | do | do | Do. |
| K67 | 150-125 | 10-15 | 19¾ | Insoluble | do | Do. |
| K68 | 125-130 | 10-15 | ¾ | do | do | Do. |
| K69 | 125-130 | 10-15 | 1 | Emulsifiable | dp | Do. |
| K70 | 125-130 | 10-15 | 1½ | do | do | Do. |
| K71 | 125-130 | 10-15 | 3 | do | do | Do. |
| K72 | 125-130 | 10-15 | 3½ | do | do | Do. |
| K73 | 150-125 | 10-15 | 14 | Insoluble | do | Soluble. |
| K74 | 125-130 | 10-15 | 2 | do | do | Do. |
| K75 | 125-130 | 10-15 | 2¼ | do | do | Do. |
| K76 | 125-130 | 10-15 | 2½ | do | do | Do. |
| K77 | 125-130 | 10-15 | 5 | do | do | Do. |
| K78 | 125-130 | 10-15 | 5¾ | do | do | Do. |
| K79 | 150-125 | 10-15 | 14¾ | do | do | Do. |
| K80 | 125-130 | 10-15 | 2½ | do | do | Do. |
| K81 | 125-130 | 10-15 | 2½ | do | do | Do. |
| K82 | 125-130 | 10-15 | 3 | do | do | Do. |
| K83 | 125-130 | 10-15 | 6 | do | do | Do. |
| K84 | 125-130 | 10-15 | 7¼ | do | do | Do. |
| K85 | 150-125 | 10-15 | 16¾ | do | do | Do. |
| K86 | 125-130 | 10-15 | 2¾ | do | do | Do. |
| K87 | 125-130 | 10-15 | 3 | do | do | Do. |
| K88 | 125-130 | 10-15 | 6 | do | do | Do. |
| K89 | 125-130 | 10-15 | 6½ | do | do | Do. |
| K90 | 125-130 | 10-15 | 7¾ | do | do | Do. |

TABLE XIII

| Ex. No. | Max. temp., °C. | Max. pres., p.s.i. | Time, hrs. | Solubility Water | Solubility Xylene | Solubility Kerosene |
|---|---|---|---|---|---|---|
| L1 | 150-125 | 10-15 | 32 | Insoluble | Soluble | Soluble. |
| L2 | 125-130 | 10-15 | 1 | ---do--- | ---do--- | Do. |
| L3 | 125-130 | 10-15 | 2 | ---do--- | ---do--- | Do. |
| L4 | 125-130 | 10-15 | 2 | ---do--- | ---do--- | Do. |
| L5 | 125-130 | 10-15 | 3 | Emulsifiable | ---do--- | Insoluble. |
| L6 | 125-130 | 10-15 | 3¼ | ---do--- | ---do--- | Do. |
| L7 | 150-125 | 10-15 | 37½ | Insoluble | ---do--- | Insoluble. |
| L8 | 125-120 | 10-15 | 1½ | ---do--- | ---do--- | Do. |
| L9 | 125-130 | 10-15 | 2 | ---do--- | ---do--- | Do. |
| L10 | 125-130 | 10-15 | 2¼ | ---do--- | ---do--- | Do. |
| L11 | 125-130 | 10-15 | 2¾ | Emulsifiable | ---do--- | Insoluble. |
| L12 | 125-130 | 10-15 | 3¾ | ---do--- | ---do--- | Do. |
| L13 | 150-125 | 10-15 | 44 | Insoluble | ---do--- | Soluble. |
| L14 | 125-130 | 10-15 | 1¾ | ---do--- | ---do--- | Do. |
| L15 | 125-130 | 10-15 | 2 | ---do--- | ---do--- | Do. |
| L16 | 125-130 | 10-15 | 2½ | ---do--- | ---do--- | Do. |
| L17 | 125-130 | 10-15 | 5 | Emulsifiable | ---do--- | Insoluble. |
| L18 | 125-130 | 10-15 | 6 | ---do--- | ---do--- | Do. |
| L19 | 150-125 | 10-15 | 13 | ---do--- | ---do--- | Do. |
| L20 | 125-130 | 10-15 | 3 | ---do--- | ---do--- | Do. |
| L21 | 125-130 | 10-15 | 3½ | ---do--- | ---do--- | Do. |
| L22 | 125-130 | 10-15 | 4 | ---do--- | ---do--- | Do. |
| L23 | 125-130 | 10-15 | 4¾ | ---do--- | ---do--- | Do. |
| L24 | 125-130 | 10-15 | 5½ | ---do--- | ---do--- | Do. |
| L25 | 150-125 | 10-15 | 25 | ---do--- | ---do--- | Do. |
| L26 | 125-130 | 10-15 | 2¾ | ---do--- | ---do--- | Do. |
| L27 | 125-130 | 10-15 | 3 | ---do--- | ---do--- | Do. |
| L28 | 125-130 | 10-15 | 3½ | ---do--- | ---do--- | Do. |
| L29 | 125-130 | 10-15 | 4 | ---do--- | ---do--- | Do. |
| L30 | 125-130 | 10-15 | 5½ | ---do--- | ---do--- | Do. |
| L31 | 150-125 | 10-15 | 31¾ | ---do--- | ---do--- | Do. |
| L32 | 125-130 | 10-15 | 2¾ | ---do--- | ---do--- | Do. |
| L33 | 125-130 | 10-15 | 3 | ---do--- | ---do--- | Do. |
| L34 | 125-130 | 10-15 | 3¾ | ---do--- | ---do--- | Do. |
| L35 | 125-130 | 10-15 | 4 | ---do--- | ---do--- | Do. |
| L36 | 125-130 | 10-15 | 5 | ---do--- | ---do--- | Do. |

PART 7

As to the use of conventional demulsifying agents reference is made to U.S. Patent No. 2,626,929, dated January 7, 1953, to DeGroote, and particularly to Part 3. Everything that appears therein applies with equal force and effect to the instant process, noting only that where reference is made to Example 13b in said text beginning in column 15 and ending in column 18, reference should be to Example K2, herein described.

PART 8

The products, compounds, or the like, herein described can be employed for various purposes and particularly for the resolution of petroleum emulsions of the water-in-oil type as described in detail in Part 7, preceding.

Such products can be reacted with alkylene imines, such as ethylene imine or propylene imine, to produce cation-active materials. Instead of an imine one may employ what is somewhat equivalent material, to wit, a dialkylaminoepoxypropane of the structure

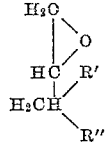

wherein R' and R'' are alkyl groups.

It is not necessary to point out that, after reaction with a reactant of the kind described which introduces a basic nitrogen atom, the resultant product can be employed for the resolution of emulsions of the water-in-oil type as described in Part 7, preceding, and also for other purposes described hereinafter.

Referring now to the use of the products obtained by reaction with a polyepoxide and certain specified oxyalkylated products obtained in the manner described in Part 6, preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, drying, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

More specifically, such products, depending on the nature of the initial resin, the particular monoepoxide selected and the ratio of monoepoxide to resin, together with the particular polyepoxide employed, result in a variety of materials which are useful as wetting agents or surface tension reducing agents; as detergents, emulsifiers of dispersing agents; as additives for lubricants, both of the natural petroleum type and the synthetic type, as additives in the flotation of ores, and at times as aids in chemical reactions insofar that demulsification is produced between the insoluble reactants. Furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

The products herein described can be reacted with polycarboxy acids such as phthalic acid, or anhydride, maleic acid or anhydride, diglycolic acid, and various tricarboxy and tetracarboxy acids so as to yield acylated derivatives particularly if one employs one mole of the polycarboxy acid for each reactive hydroxyl radical present in the final polyepoxide treated product. Thus, one obtains a comparatively large molecule in which there is a plurality of carboxyl radicals. Such acidic fractional esters are suitable for the resolution of petroleum emulsions of the water-in-oil type as herein described.

Having thus described our invention what we claim as new and desire to secure by Letters Patent, is:

A two-step manufacturing process consisting of first reacting at a temperature of 83° to 205° for from 0.5 to 24 hours (A) a material selected from the class consisting of lower monoalkanolamines, lower dialkanolamines, lower trialkanolamines, mono- and dialkylamines wherein the alkyl group contains up to 18 carbon atoms, lower alkyl, aryl and lower alkylaryl alkanolamines, aryl lower alkylaryl and diaryl amines, morpholine, N-aminoalkyl morpholines, N-hydroxyalkyl morpholines, furfurylamine, lower dialkyl ureas, cycloalkyl amines, amino lower alkyl alkanediols, alkylene diamines wherein the alkylene group contains up to 6 carbon atoms, phenylene diamine, aminophenols, arylsulfonyl lower alkyl amides, polyethylene polyamines, polyethylene polyamines reacted with up to 25 moles of propylene oxide, alkylene diamines containing up to 6 carbon atoms reacted with up to 25 moles of propylene oxide, triethanolamine reacted with up to 27 moles of ethylene oxide, triethanolamine reacted with up to 30 moles of propylene oxide, and furfurylamine reacted with up to 50 moles of propylene oxide, and (B) 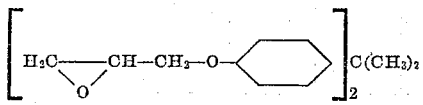

the ratio of reactants being in the proportion of 2 moles of (A) per one mole of (B); followed by a second step of reacting the reaction product of (A) and (B) with an alpha-beta alkylene oxide selected from the class consisting of ethylene oxide, propylene oxide, butylene oxide, glycide and methylglycide.

References Cited in the file of this patent

UNITED STATES PATENTS

| | | |
|---|---|---|
| 2,423,643 | Ericks | July 8, 1947 |
| 2,828,276 | De Groote | Mar. 25, 1958 |
| 2,828,277 | De Groote | Mar. 25, 1958 |
| 2,828,282 | De Groote | Mar. 25, 1958 |
| 2,839,497 | De Groote | June 17, 1958 |
| 2,839,502 | De Groote | June 17, 1958 |
| 2,839,503 | De Groote | June 17, 1958 |

OTHER REFERENCES

Wiggins: The Petroleum Engineer, pages B47–B56 (May 1957).

Royals: Advanced Organic Chemistry (textbook), 2nd printing, 1956, pages 627, 628 and 631; Prentice-Hall, Inc.